(12) United States Patent
Maesen et al.

(10) Patent No.: US 8,702,970 B2
(45) Date of Patent: *Apr. 22, 2014

(54) HYDROCONVERSION MULTI-METALLIC CATALYST AND METHOD FOR MAKING THEREOF

(71) Applicants: Theodorus Ludovicus Michael Maesen, Moraga, CA (US); Alexander E. Kuperman, Orinda, CA (US)

(72) Inventors: Theodorus Ludovicus Michael Maesen, Moraga, CA (US); Alexander E. Kuperman, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,256

(22) Filed: Nov. 14, 2012

(65) Prior Publication Data

US 2013/0068662 A1 Mar. 21, 2013

Related U.S. Application Data

(62) Division of application No. 12/259,451, filed on Oct. 28, 2008, now Pat. No. 8,343,887.

(51) Int. Cl.
| | | |
|---|---|---|
| C10G 11/04 | (2006.01) | |
| C10G 25/00 | (2006.01) | |
| C10G 45/00 | (2006.01) | |

(52) U.S. Cl.
USPC ............ 208/111.1; 208/253; 208/111.15; 208/112; 208/121; 208/143; 208/213; 208/216 R; 208/216 PP; 208/217; 208/251 H; 208/254 H

(58) Field of Classification Search
USPC ........ 208/111.15, 112, 121, 143, 213, 216 R, 208/216 PP, 217, 251 H, 254 H, 111.1, 253
See application file for complete search history.

(56) References Cited

U.S. PATENT DOCUMENTS

| | | | |
|---|---|---|---|
| 1,955,829 A | 4/1934 | Pier et al. |
| 3,673,079 A | 6/1972 | Mulaskey et al. |
| 3,709,814 A | 1/1973 | Jaffe |
| 3,795,632 A | 3/1974 | Morgan et al. |
| 4,003,851 A | 1/1977 | Ebel et al. |
| 4,009,096 A | 2/1977 | Pollitzer et al. |
| 4,226,742 A | 10/1980 | Bearden et al. |
| 4,430,442 A | 2/1984 | Sawyer et al. |
| 4,508,847 A | 4/1985 | Chianelli et al. |
| 4,540,481 A | 9/1985 | Sawyer et al. |
| 4,542,121 A | 9/1985 | Mitchell et al. |
| 4,579,728 A | 4/1986 | Schoenthal et al. |
| 4,595,672 A | 6/1986 | Ho et al. |
| 4,637,870 A | 1/1987 | Bearden et al. |
| 4,666,878 A | 5/1987 | Jacobson et al. |
| 4,719,002 A | 1/1988 | Mayer et al. |
| 4,721,558 A | 1/1988 | Jacobson et al. |
| 4,740,295 A | 4/1988 | Bearden et al. |
| 4,765,882 A | 8/1988 | Aldridge et al. |
| 4,820,677 A | 4/1989 | Jacobson et al. |
| 4,826,797 A | 5/1989 | Chianelli et al. |
| 4,831,002 A | 5/1989 | Ho et al. |
| 4,836,912 A | 6/1989 | Schlosberg et al. |
| 4,976,848 A | 12/1990 | Johnson |
| 5,026,473 A | 6/1991 | Halbert et al. |
| 5,037,532 A | 8/1991 | Winter et al. |
| 5,039,392 A | 8/1991 | Bearden et al. |
| 5,053,376 A | 10/1991 | Bearden et al. |
| 5,122,258 A | 6/1992 | Eadie et al. |
| 5,162,281 A | 11/1992 | Kamo et al. |
| 5,252,199 A | 10/1993 | Singhal et al. |
| 5,278,121 A | 1/1994 | Singhal et al. |
| 5,300,212 A | 4/1994 | Winter, Jr. |
| 5,384,336 A | 1/1995 | Koros |
| 5,397,456 A | 3/1995 | Dai et al. |
| 5,648,577 A | 7/1997 | Ho et al. |
| 5,695,632 A | 12/1997 | Brons et al. |
| 5,728,644 A | 3/1998 | Ho et al. |
| 5,767,037 A | 6/1998 | Ho et al. |
| 5,831,138 A | 11/1998 | Ho et al. |
| 5,872,073 A | 2/1999 | Hilsenbeck et al. |
| 5,900,384 A | 5/1999 | Soltani-Ahmadi et al. |
| 5,935,418 A | 8/1999 | Chakrabarty et al. |
| 5,935,421 A | 8/1999 | Brons et al. |
| 5,935,897 A | 8/1999 | Trubenbach et al. |

(Continued)

FOREIGN PATENT DOCUMENTS

| | | |
|---|---|---|
| EP | 526988 | 10/1993 |
| EP | 1169414 | 10/2008 |
| EP | 2103347 | 9/2009 |
| WO | WO 0204117 | 1/2002 |
| WO | WO2007070394 | 6/2007 |

OTHER PUBLICATIONS

Co-pending U.S. Appl. No. 12/432,719, filed Apr. 29, 2009.
Co-pending U.S. Appl. No. 12/432,721, filed Apr. 29, 2009.
Co-pending U.S. Appl. No. 12/432,723, filed Apr. 29, 2009.
Co-pending U.S. Appl. No. 12/432,727, filed Apr. 29, 2009.
Co-pending U.S. Appl. No. 12/432,728, filed Apr. 29, 2009.

(Continued)

*Primary Examiner* — Elizabeth Wood

(57) ABSTRACT

A method for hydroprocessing a hydrocarbon feedstock is provided. The method comprises contacting the feedstock with a catalyst under hydroprocessing conditions, wherein the catalyst is formed by sulfiding an unsupported catalyst precursor of the general formula $A_v[(M^P)(OH)_x(L)^n_y]_z (M^{VIB}O_4)$, wherein $M^P$ is selected from Group VIII, Group IIB, Group IIA, Group IVA and combinations thereof; L is one or more oxygen-containing ligands, and L has a neutral or negative charge $n<=0$, $M^{VIB}$ is at least a Group VIB metal having an oxidation state of +6; $M^P:M^{VIB}$ has an atomic ratio between 100:1 and 1:100; $v-2+P*z-x*z+n*y*z=0$; and $0 \le y \le -P/n$; $0 \le x \le P$; $0 \le v \le 2$; $0 \le z$. In one embodiment, the catalyst precursor further comprises a cellulose-containing material. In another embodiment, the catalyst precursor further comprises at least a diluent (binder). In one embodiment, the diluent is a magnesium aluminosilicate clay.

13 Claims, 9 Drawing Sheets

(56) References Cited

U.S. PATENT DOCUMENTS

| | | | |
|---|---|---|---|
| 5,977,192 | A | 11/1999 | Howsmon et al. |
| 6,030,915 | A | 2/2000 | de Boer |
| 6,156,695 | A | 12/2000 | Soled et al. |
| 6,162,350 | A | 12/2000 | Soled et al. |
| 6,171,471 | B1 | 1/2001 | Ferrughelli et al. |
| 6,299,760 | B1 | 10/2001 | Soled et al. |
| 6,461,995 | B1 | 10/2002 | Addiego et al. |
| 6,531,516 | B2 | 3/2003 | Davis et al. |
| 6,534,437 | B2 | 3/2003 | Eijsbouts et al. |
| 6,566,296 | B2 | 5/2003 | Plantenga et al. |
| 6,620,313 | B1 | 9/2003 | Demmin et al. |
| 6,635,599 | B1 | 10/2003 | Eijsbouts et al. |
| 6,652,738 | B2 | 11/2003 | Eijsbouts et al. |
| 6,712,955 | B1 | 3/2004 | Hou et al. |
| 6,758,963 | B1 | 7/2004 | Hantzer et al. |
| 6,783,663 | B1 | 8/2004 | Riley et al. |
| 6,919,066 | B2 | 7/2005 | Holzle et al. |
| 7,183,005 | B2 | 2/2007 | Poloso et al. |
| 7,229,548 | B2 | 6/2007 | Riley et al. |
| 7,232,515 | B1 | 6/2007 | Demmin et al. |
| 7,288,182 | B1 | 10/2007 | Soled et al. |
| 7,387,983 | B2 | 6/2008 | Holzle |
| 7,507,770 | B2 | 3/2009 | Dogterom et al. |
| 2002/0010088 | A1 | 1/2002 | Eijsbouts et al. |
| 2002/0045539 | A1 | 4/2002 | Kasztelan |
| 2003/0102254 | A1 | 6/2003 | Eijsbouts et al. |
| 2003/0150778 | A1 | 8/2003 | Haluska et al. |
| 2004/0235653 | A1 | 11/2004 | Domokos et al. |
| 2005/0040080 | A1 | 2/2005 | Riley et al. |
| 2005/0250863 | A1 | 11/2005 | Green et al. |
| 2006/0060502 | A1 | 3/2006 | Soled et al. |
| 2006/0060503 | A1 | 3/2006 | Soled et al. |
| 2006/0157386 | A1 | 7/2006 | Al-Naeem et al. |
| 2007/0084754 | A1 | 4/2007 | Soled et al. |
| 2007/0090023 | A1 | 4/2007 | Soled et al. |
| 2007/0090024 | A1 | 4/2007 | Soled et al. |
| 2008/0060977 | A1 | 3/2008 | Bhan |
| 2008/0132407 | A1 | 6/2008 | Bai et al. |
| 2008/0275286 | A1 | 11/2008 | Xiao et al. |
| 2008/0306172 | A1 | 12/2008 | Reynhout et al. |
| 2008/0308462 | A1 | 12/2008 | Eijsbouts-Spickova et al. |
| 2009/0014356 | A1 | 1/2009 | Eijsbouts-Spickova et al. |

OTHER PUBLICATIONS

Co-pending U.S. Appl. No. 12/432,730, filed Apr. 29, 2009.
Co-pending U.S. Appl. No. 12/770,388, filed Apr. 29, 2010.
PCT Search Report and Written Opinion for PCT/US08/81463 mailed Jan. 14, 2009.
Catalysis Today 41 (1998) pp. 207-219 "Surface Area and Pore Structure of Catalysts" by Leofanti et al.
Energy & Fuels 2009, 23, pp. 1683-1694 "Atmospheric Residues of Kuwait Heavy Crude Upgrading: A Pilot Plant and Model Simulation Study" by Bahzad et al.
Chemical Engineering Science 62 (2007) pp. 463-470 "Drying of wet agglomerates in a continuous fluid bed: Infludence of Residence time, air temperature and air flow rate on the drying kinetics and the amount of oversize particles" by S. Palzer.
"Molecular Weight Distribution in Heavy Crudes" 1998 Paper authored by Boduszynski et al.
Energy & fuels pp. 1065-1071 "Estimation of Total Aromatic Content of Vacuum Gas Oil (VGO) Fractions (370-560° C.) by 1H NMR Spectroscopy" by Kapur et al.
Adsorption-Desorption Isotherm Studies of Catalysts, Ries et al., The Sixclair Kefinlngc Company, Aug. 1945.
Hydrodesulfurizafion Activity MoS2 and Bimetallic: Catalysts Prepared by in Situ Decomposition of Thiosalt, Trakarnpruk et at, *Ind. Eng. Chem. Res.* 2007, 46, 1874-1882.
MgO-supported Mo, CoMo and NiMo sulfide hydrotreating catalysts, Zdražil, Catalysis Today 86 (2003) 151-171.
Cobalt-molybdenum sulfide catalysts prepared by in situ activation of bimetallic (Co-Mo) alkylthiomolybdates, Nava et al., Catalysis Letters vol. 86, No. 4, Mar. 2003.
Structured zeolites catalysts with hierarchical channel structure, Gu et al., www.rsc.org/chemcomm. Feb. 2010.
Pore structure of bulk tungsten carbide power catalysts, Lofberg et al., Catalysis Letters 33 (1995) 165-173.
Preparation of Cr2O3-promoted copper catalysts on rice husk ash by incipient wetness impregnation, Chang et al., Applied Catalysis A: General 288 (2005) 53-61.
Determination of effectiveness factor of a partial internal wetting catalyst from adsorption measurement, zhou et al., Chemical Engineering Science 59 (2004) 4305-4311.
Chemisorption of Hydrogen Sulfide on Nickel and Ruthium Catalysts, Oliphant et 0.1., Journal of Catalysis 51, 229-242 (1978).
Lower Closure Point of Adsorption Hysteresis in Ordered Mesoporous Silicas, Morishige et al., *Langmuir* 2007, 23, 11021-11026.
Physisorption hysteresis loops and the characterization of nanoporous materials, Sing et al., Adsorption Science & Technology (2004), 22(10), 773-782.
Eurasian Search Report dated Dec. 22, 2010.

HYDROCONVERSION MULTI-METALLIC CATALYST AND METHOD FOR MAKING THEREOF

CROSS-REFERENCE TO RELATED APPLICATIONS

This application is a divisional of U.S. patent application Ser. No. 12/259,451, with a filing date of Oct. 28, 2008. This application claims priority to and benefits from the foregoing, the disclosures of which are incorporated herein by reference.

TECHNICAL FIELD

The invention relates generally to a hydroprocessing catalyst precursor, processes for preparing the catalyst precursor, multi-metallic catalysts prepared using the catalyst precursor, and hydroconversion processes employing the multi-metallic catalysts.

BACKGROUND

The petroleum industry is increasingly turning to heavy crudes, resids, coals and tar sands as sources for feedstocks. Feedstocks derived from these heavy materials contain more sulfur and nitrogen than feedstocks derived from more conventional crude oils, requiring a considerable amount of upgrading in order to obtain usable products therefrom. The upgrading or refining generally being accomplished by hydrotreating processes, i.e., treating with hydrogen of various hydrocarbon fractions, or whole heavy feeds, or feedstocks, in the presence of hydrotreating catalysts to effect conversion of at least a portion of the feeds to lower molecular weight hydrocarbons, or to effect the removal of unwanted components, or compounds, or their conversion to innocuous or less undesirable compounds.

Hydrotreating is well known in the art and typically requires treating the petroleum streams with hydrogen in the presence of a supported or unsupported catalyst at hydrotreating conditions. Supported catalysts are usually comprised of at least one Group VIB metal with one or more Group VIII metals as promoters on a refractory support, such as alumina. Hydrotreating catalysts that are particularly suitable for hydrodesulphurization, hydrodearomatization, as well as hydrodenitrogenation, generally contain molybdenum and/or tungsten promoted with a metal such as cobalt, nickel, iron, or a combination thereof. Cobalt promoted molybdenum on alumina catalysts are most widely used when the limiting specifications are hydrodesulphurization. Nickel promoted molybdenum on alumina catalysts are the most widely used for hydrodenitrogenation, partial aromatic saturation, as well as hydrodesulphurization.

Unsupported mixed Group VIII and Group VIB metal catalysts and catalyst precursors used for hydroconversion processes are known in the art as disclosed in U.S. Pat. Nos. 2,238,851; 5,841,013; 6,156,695; 6,566,296 and 6,860,987, amongst others.

Hydrotreating catalysts based on group IIB metals such as zinc were one of the first base metal hydrotreating catalysts invented, and were described in U.S. Pat. Nos. 1,922,499; 1,932,673; and 1,955,829. However, U.S. Pat. No. 4,698,145 teaches that group VIB metals based catalyst exhibit performance superior to group IIB metals based catalysts. Hydrotreating catalysts based on group IVA metals such as tin or lead were described U.S. Pat. Nos. 4,560,470 and 5,872,073.

Unsupported mixed Group IIB and Group VIB metal catalysts and catalyst precursors are known in the art. Methods for making catalyst precursors and catalyst precursor compositions in the form of oxides of a Group IIB metal and molybdenum and tungsten are taught in, for example, U.S. Pat. Nos. 1,932,673 and 1,955,829. Sulfided hydrogenation catalysts of molybdenum and tungsten are also known. U.S. Pat. No. 4,698,145 teaches the process of making a sulfided catalyst with ammonium thio salts of Group VIB metals such as molybdenum or tungsten and salts of zinc in the presence of a nitrogen containing additive. Unsupported mixed group IVA and group VIB metal catalysts and catalyst precursors are also known in the art. These are made from the chlorides and sulfides in a multistep synthesis as described in, for example, U.S. Pat. Nos. 4,560,470 and 5,872,073.

As the environmental impact of effluents or water disposal from industries has become increasingly scrutinized, there is a need to limit the use of toxic materials to the greatest extent possible. In the process of making catalyst precursors in the prior art, chelating agents such as ethylene diamine(tetra) acetic acid (EDTA), hydroxyethylene diamine triacetic acid, and diethylene triamine pentaacetic acid, etc. are employed. These materials are far from environmentally benign.

Under the reaction conditions employed in hydrotreating processes, catalyst performance, over time on stream, tends to become fouled with carbon deposits, especially when the feedstock includes the heavier, more refractory fractions of hydrocarbon, S and N species in the heavier crude oil. The accumulation of such deposits tends to reduce the catalyst activity. Thus, catalyst average temperature (or C.A.T.) needs to be raised gradually in order to maintain product quality, such as the N concentration in the upgraded product. The rate of C.A.T. being raised per unit time is defined as the fouling rate of catalyst.

Catalyst performance depends on a number of factors. For some catalysts, an important factor is the partial pressure of hydrogen employed in the process. A low pressure process can be generally described as having a pressure of less than 600 psig, and in one embodiment, between 400 to 600 psig. In a very low to low pressure hydroconversion process, some unsupported multi-metallic catalysts in the prior art have relative activity that is about ~⅓ of the activity at moderate to high pressure process (2000 to 3000 psig and elevated temperatures generally ranging upward from 650° F.). Multi-metallic catalysts in the prior art are not suitable for use in low pressure reactors of 300-400 psi due to their low activity.

There is a need for improved hydrodesulfurization (HDS), hydrodearomatization (HDA) and hydrodenitrogenation (HDN) catalysts having the appropriate morphology, structure, and optimum catalytic activity for high yield conversions of lower grade hydrocarbon feedstocks to higher value products. There is a need for a process for making such improved catalysts. There is still a need for chelating agents in the manufacture of catalyst precursors that are less toxic or more environmentally friendly or biodegradable without impairing performance in hydroprocessing catalysis. There is a need for catalysts with improved fouling resistance characteristics. There is also a need for catalysts that perform satisfactorily even in low pressure hydroconversion processes.

SUMMARY OF THE INVENTION

In one aspect, the invention relates to a process for forming catalyst precursor composition having a formula $A_v[(M^P)(OH)_x(L)^n{}_y]_z(M^{VIB}O_4)$, the process comprises the step of: a) forming a first reaction mixture having a pH from about 1 to about 6: at least a metal compound selected from Group VIII, Group IIB, Group IIA, Group IVA and combinations thereof; at least a Group VIB metal compound; at least one organic oxygen-containing ligand; at least a silicon component; at least an aluminum component; and at least a magnesium component; b) adding a basic alkali component to form a second reaction mixture having a pH between 7 to 12; and c) reacting the second reaction mixture for a time sufficient forming a precipitate or cogel; wherein A is at least one of an alkali metal cation, an ammonium, an organic ammonium and a phosphonium cation; $M^P$ is selected from Group VIII, Group IIB, Group IIA, Group IVA and combinations thereof, $M^P$ has an oxidation state of either +2 or +4; L is at least one organic oxygen-containing ligand; $M^{VIB}$ is at least a Group VIB metal, having an oxidation state of +6; $M^P$:$M^{VIB}$ has an atomic ratio of 100:1 to 1:100; v−2+P*z−x*z+n*y*z=0; and 0≤y≤−P/n; 0≤x≤P; 0≤v≤2; 0≤z.

In another aspect, the invention relates to a charged-neutral catalyst precursor composition of a charge-neutral catalyst precursor composition of the formula $A_v[(M^P)(OH)_x(L)^n_y]_z(M^{VIB}O_4)$, wherein the catalyst precursor comprises a magnesium aluminosilicate clay and wherein A is at least one of an alkali metal cation, an ammonium, an organic ammonium and a phosphonium cation; $M^P$ is selected from Group VIII, Group IIB, Group IIA, Group IVA and combinations thereof, $M^P$ has an oxidation state of either +2 or +4; L is at least one organic oxygen-containing ligand; $M^{VIB}$ is at least a Group VIB metal, having an oxidation state of +6; $M^P$:$M^{VIB}$ has an atomic ratio of 100:1 to 1:100; v−2+P*z−x*z+n*y*z=0; and 0≤y≤−P/n; 0≤x≤P; 0≤v≤2; 0≤z.

DETAILED DESCRIPTION

Figure 1:
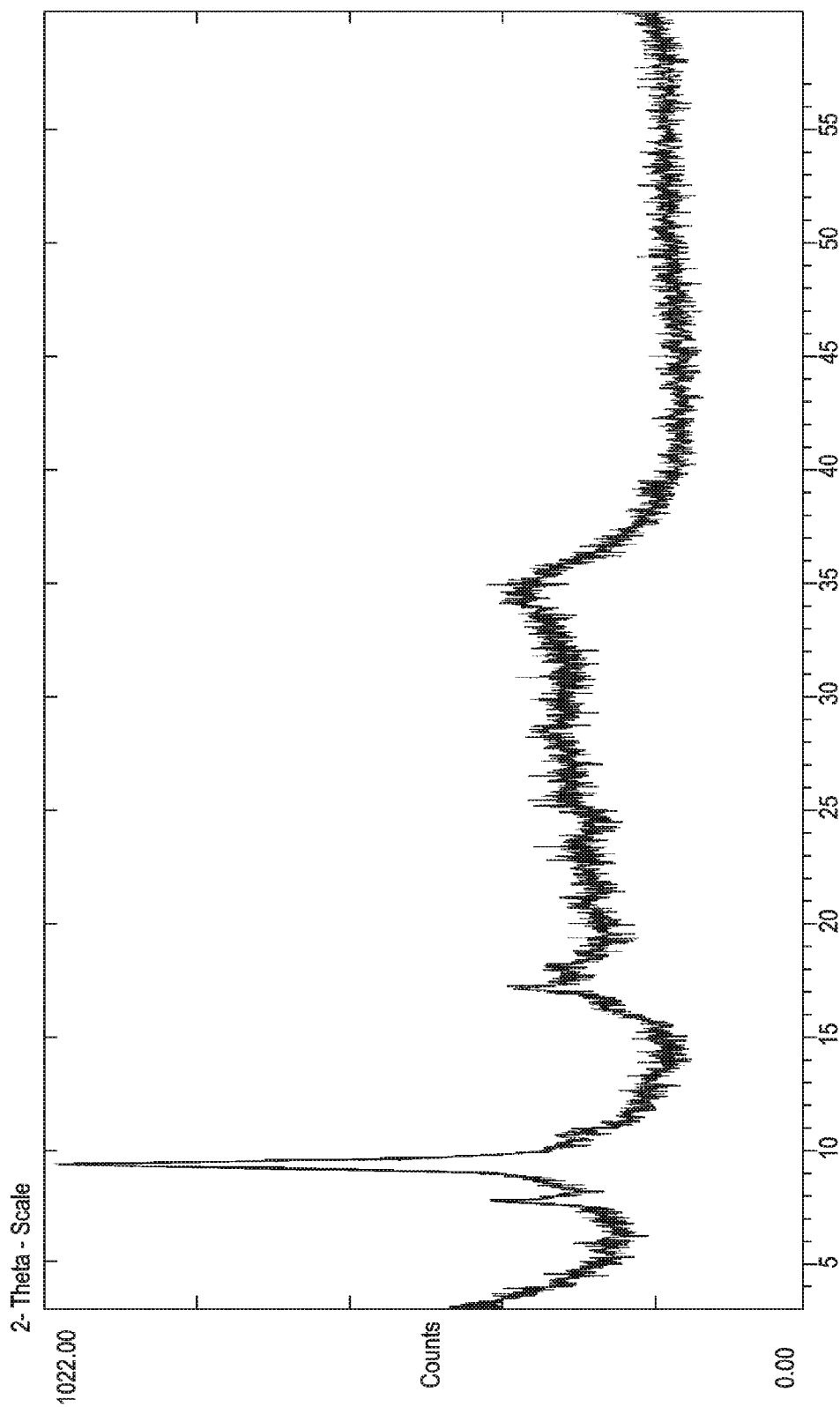
FIG. 1 is a powder X-ray diffraction pattern of an embodiment of a catalyst precursor in the prior art (Ni/Mo/W).

The following terms will be used throughout the specification and will have the following meanings unless otherwise indicated.

SCF/BBL (or scf/bbl, or scfb or SCFB) refers to a unit of standard cubic foot of gas ($N_2$, $H_2$, etc.) per barrel of hydrocarbon feed.

LHSV means liquid hourly space velocity.

C.A.T. means the catalyst average temperature, based on multiple readings in the catalyst bed.

The Periodic Table referred to herein is the Table approved by IUPAC and the U.S. National Bureau of Standards, an example is the Periodic Table of the Elements by Los Alamos National Laboratory's Chemistry Division of October 2001.

The term "Group VIB" or "Group VIB metal" refers to chromium, molybdenum, tungsten, and combinations thereof in their elemental, compound, or ionic form.

The term "Group IIB" or "Group IIB metal" refers to zinc, cadmium, mercury and combinations thereof in their elemental, compound, or ionic form.

The term "Group IIA" or "Group IIA metal" refers to beryllium, magnesium, calcium, strontium, barium, radium, and combinations thereof in their elemental, compound, or ionic form.

The term "Group IVA" or "Group IVA metal" refers to germanium, tin or lead, and combinations thereof in their elemental, compound, or ionic form.

The term "Group VIII" or "Group VIII metal" refers to iron, cobalt, nickel, ruthenium, rhenium, palladium, osmium, iridium, platinum, and combinations thereof in their elemental, compound, or ionic form.

As used herein, the term $M^P$, or "Promoter metal" means any of: at least one of Group VIII metals; at least one of Group IIB metals; at least one of Group IIA metals; at least of one of Group IVA metals; a combination of different Group IIB metals; a combination of different Group IIA metals; a combination of different Group IVA, IIA, IIB, or VIII metals; a combination of at least a Group IIB metal and at least a Group IVA metal; a combination of at least a Group IIB metal and at least a group VIII metal; a combination of at least a Group IVA metal and at least a group VIII metal; a combination of at least a Group IIB metal, at least a Group IVA metal and at least a group VIII metal; and combinations at least two metals, with the individual metal being from any of Group VIII, Group IIB, Group IIA, and Group IVA metals.

As used herein, the phrases "one or more of" or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and Zn).

As used herein, "hydroconversion" or "hydroprocessing" is meant any process that is carried out in the presence of hydrogen, including, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydrocracking including selective hydrocracking. Depending on the type of hydroprocessing and the reaction conditions, the products of hydroprocessing can show improved viscosities, viscosity indices, saturates content, low temperature properties, volatilities and depolarization, etc.

As used herein, the term "catalyst precursor" refers to a compound containing at least a Promoter metal selected from Group VIII, Group IIB, Group IIA, Group IVA and combinations thereof (i.e., one or more Group VIII metals, one or more Group IIB metals, one or more Group IIA metals, one or more Group IVA metals, and combinations thereof), at least a Group VIB metal; at least a hydroxide; and one or more organic oxygen-containing ligands, and which compound can be catalytically active after sulfidation as a hydroprocessing catalyst.

As used herein, the term "charge-neutral" refers to the fact that the catalyst precursor carries no net positive or negative charge. The term "charge-neutral catalyst precursor" can sometimes be referred to simply as "catalyst precursor."

As used herein, the term "ammonium" refers to a cation with the chemical formula $NH_4^+$ or to organic nitrogen containing cations, such as organic quaternary amines.

As used herein, the term "phosphonium" refers to a cation with the chemical formula $PH_4^+$ or to organic phosphorus-containing cations.

The term oxoanion refers to monomeric oxoanions and polyoxometallates.

As used herein, the term "mixture" refers to a physical combination of two or more substances. The "mixture" can be homogeneous or heterogeneous and in any physical state or combination of physical states.

The term "reagent" refers to a raw material that can be used in the manufacture of the catalyst precursor of the invention. When used in conjunction with a metal, the term "metal" does not mean that the reagent is in the metallic form, but is present as a metal compound.

As used herein the term "carboxylate" refers to any compound containing a carboxylate or carboxylic acid group in the deprotonated or protonated state.

As used herein, the term "ligand" may be used interchangeably with "chelating agent" (or chelator, or chelant), referring to an additive that combines with metal ions, e.g., Group VIB and/or Promoter metals, forming a larger complex, e.g., a catalyst precursor.

As used herein, the term "organic" means containing carbon, and wherein the carbon can be from biological or non-biological sources.

As used herein, the term "organic oxygen-containing ligand" refers to any compound comprising at least one carbon atom, at least one oxygen atom, and at least one hydrogen atom wherein said oxygen atom has one or more electron pairs available for co-ordination to the Promoter metal(s) or Group VIB metal ion. In one embodiment, the oxygen atom is negatively charged at the pH of the reaction. Examples of organic oxygen-containing ligands include, but are not limited to, carboxylic acids, carboxylates, aldehydes, ketones, the enolate forms of aldehydes, the enolate forms of ketones, hemiacetals, and the oxo anions of hemiacetals.

The term "cogel" refers to a hydroxide co-precipitate (or precipitate) of at least two metals containing a water rich phase. "Cogelation" refers to the process of forming a cogel or a precipitate.

As used herein, the term "biodegradable" refers to a material that readily degrades under aerobic and/or anaerobic conditions in the presence of bacteria, fungi, algae, and/OR other microorganisms to carbon dioxide/methane, and/or water and biomass, although materials containing heteroatoms can also yield other products such as ammonia or sulfur dioxide. The term includes degradation by exposure to ultraviolet light, sunlight, temperatures and pressures normally found in the biosphere. The time required for degradation is not, however, fixed. Preferably, degradation takes place quickly after exposure to environmental conditions such as in a landfill, but even if degradation takes more than a trivial amount of time, the material can still be considered "readily biodegradable."

As used herein, the term "non-toxic" refers to the requirements of the LD 50 Oral Toxicity Test. LD means "lethal dosage." LD50 is the amount of a material, given all at once, causes the death of 50% (one half) of a group of test animals. LD-50 measures the short-term poisoning potential (acute toxicity) of a material with the testing being done with smaller animals such as rats and mice (in mg/Kg).

As used herein, a non-toxic material means the material has an LD50 of greater than 500 mg/Kg (as single oral dose to rats).

As used herein, fouling rate means the rate at which the hydroconversion reaction temperature needs to be raised per unit time, e.g., ° F. per 1000 hours, in order to maintain a given hydrodenitrogenation rate (e.g., nitrogen level in the upgraded products, desired hydrodenitrogenation rate, etc.).

As used herein, the fouling rate is measured in a hydrodenitrogenation (HDN) system with a single catalyst, employing a vacuum gas oil (VGO) having properties of Table 3 as the feed, including 4.6 CSt viscosity at 100° C., 0.928 g/cc density, 178-495° C. boiling range, and 1.66 hydrogen to carbon atomic ratio; and process condition of 370-425° C., 10 MPa pressure, 1.0 $h^{-1}$ LHSV, and hydrogen flow rate of 5000 scfb, with the HDN target of an organic nitrogen level of 20 ppm in the total amount of upgraded liquid products.

As used herein, a layered catalyst system fouling rate means the rate measured for an entire catalyst system having multiple layers of different catalysts. The rate is measured in a hydrodenitrogenation (HDN) run with vacuum gas oil (VGO) having properties of Table 3 as the feed, including 4.6 CSt viscosity at 100° C., 0.928 g/cc density, 178-495° C. boiling range, and 1.66 hydrogen to carbon atomic ratio; and process condition of 370-425° C., 10 MPa pressure, 1.0 $h^{-1}$ LHSV, and hydrogen flow rate of 5000 scfb, with the HDN target of having a nitrogen level of 20 ppm in the upgraded products.

As used herein, 700° F.+ conversion rate refers to the conversion of vacuum gas oil (VGO) feedstock to less than 700° F. (371° C.) boiling point materials in a hydroconversion process, computed as (100%*(wt. % boiling above 700° F. materials in feed−wt. % boiling above 700° F. materials in products)/wt. % boiling above 700° F. materials in feed)). In one embodiment, the vacuum gas oil (VGO) feedstock has properties of Table 3 as the feed, including 4.6 CSt viscosity at 100° C., 0.928 g/cc density, 178-495° C. boiling range, and 1.66 hydrogen to carbon atomic ratio. The hydroconversion process condition includes temperature 370-425° C., 10 MPa pressure, 1.0 $h^{-1}$ LHSV, and hydrogen flow rate of 5000 scfb.

In one aspect, the invention relates to a catalyst precursor which can be converted into a catalyst for use in hydrodesulfurization (HDS), hydrodearomatization (HDA), and hydrodenitrification (HDN), e.g., Promoter metal(s)/Group VIB sulfided metal catalyst. In one embodiment, the porosity of the Promoter metal(s)/Group VIB sulfided metal catalysts can be advantageously tuned with the use of Promoter metal hydroxides and organic oxygen-containing ligands in the synthesis of the catalyst precursor and with cellulose-containing additives during the forming of the precursor into an extrudate. Upon sulfidation of the catalyst precursor to form the active catalyst, the properties of the active catalyst is enhanced with respect to traditional sulfided zinc or cobalt molybdenum, sulfided nickel molybdenum, tungsten, and molybdotungsten catalysts.

Catalyst Precursor Formula:

In one embodiment, the charge-neutral catalyst precursor composition is of the general formula $A_v[(M^P)(OH)_x(L)^n{}_y]_z(M^{VIB}O_4)$, wherein:

A is one or more monovalent cationic species. In one embodiment, A is at least one of an alkali metal cation, an ammonium, an organic ammonium and a phosphonium cation;

$M^P$ is at least a Promoter metal with an oxidation state of either +2 or +4 depending on the Promoter metal(s) being employed. $M^P$ is selected from Group VIII, Group IIB, Group IIA, Group IVA and combinations thereof. In one embodiment, $M^P$ is at least a Group VIII metal, $M^P$ has an oxidation state P of +2. In another embodiment, $M^P$ is selected from Group IIB, Group IVA and combinations thereof.

L is one or more oxygen-containing ligands, and L has a neutral or negative charge n<=0;

$M^{VIB}$ is at least a Group VIB metal having an oxidation state of +6;

$M^P$:$M^{VIB}$ has an atomic ratio between 100:1 and 1:100;

v−2+P*z−x*z+n*y*z=0; and

0≤y≤−P/n; 0≤x≤P; 0≤v≤2; 0≤z.

In one embodiment, L is selected from carboxylates, carboxylic acids, aldehydes, ketones, the enolate forms of aldehydes, the enolate forms of ketones, and hemiacetals, and combinations thereof.

In one embodiment, A is selected from monovalent cations such as $NH_4^+$, other quaternary ammonium ions, organic phosphonium cations, alkali metal cations, and combinations thereof.

In one embodiment where both molybdenum and tungsten are used as the Group VIB metals, the molybdenum to tungsten atomic ratio (Mo:W) is in the range of about 10:1 to 1:10. In another embodiment, the ratio of Mo:W is between about 1:1 and 1:5. In an embodiment where molybdenum and tungsten are used as the Group VIB metals, the charge-neutral catalyst precursor is of the formula $A_v[(M^P) (OH)_x (L)^n_y]_z (Mo_tW_tO_4)$. In yet another embodiment, where molybdenum and tungsten are used as the Group VIB metals, chromium can be substituted for some or all of the tungsten with the ratio of (Cr+W):Mo is in the range of about 10:1 to 1:10. In another embodiment, the ratio of (Cr+W):Mo is between 1:1 and 1:5. In an embodiment where molybdenum, tungsten, and chromium are the Group VIB metals, the charge-neutral catalyst precursor is of the formula $A_v[(M^P) (OH)_x (L)^n_y]_z (Mo_tW_tCr_tO_4)$.

In one embodiment, the Promoter metal $M^P$ is at least a Group VIII metal with $M^P$ having an oxidation state of +2 and the catalyst precursor of the formula $A_v[(M^P) (OH)_x (L)^n_y]_z M^{VIB}O_4)$ to have (v−2+2z−x*z+n*y*z)=0.

In one embodiment where the Promoter metal $M^P$ is a mixture of two Group VIII metals such as Ni and Co. In yet another embodiment, $M^P$ is a combination of three metals such as Ni, Co and Fe.

In one embodiment where $M^P$ is a mixture of two group IIB metals such as Zn and Cd, the charge-neutral catalyst precursor is of the formula $A_v[(Zn_aCd_{a'}) (OH)_x (L)_y]_z (M^{VIB}O_4)$. In yet another embodiment, $M^P$ is a combination of three metals such as Zn, Cd and Hg, the charge-neutral catalyst precursor is of the formula $A_v[(Zn_aCd_aHg_{a''}) (OH)_x (L)^n_y]_z (M^{VIB}O_4)$.

In one embodiment wherein $M^P$ is a mixture of two Group IVA metals such as Ge and Sn, the charge-neutral catalyst precursor is of the formula $A_v[(Ge_b,Sn_{b'}) (OH)_x (L)^n_y]_z (M^{VIB}O_4)$. In another embodiment wherein $M^P$ is a combination of three Group IVA metals such as Ge, Sn, and Pb, the charge-neutral catalyst precursor is of the formula $A_v[(Ge_bSn_bPba_{b''}) (OH)_x (L)^n_y]_z (M^{VIB}O_4)$.

Promoter Metal Component $M^P$:

In one embodiment, the source for the Promoter metal ($M^P$) compound is in a solution state, with the whole amount of the Promoter metal compound dissolved in a liquid to form a homogeneous solution. In another embodiment, the source for the Promoter metal is partly present as a solid and partly dissolved in the liquid. In a third embodiment, it is completely in the solid state.

The Promoter metal compound $M^P$ can be a metal salt or mixtures of metal salts selected from nitrates, hydrated nitrates, chlorides, hydrated chlorides, sulphates, hydrated sulphates, carbonates, formates, acetates, oxalates, citrates, maleates, fumarate, phosphates, hypophosphites, and mixtures thereof.

In one embodiment, the Promoter metal $M^P$ is a nickel compound which is at least partly in the solid state, e.g., a water-insoluble nickel compound such as nickel carbonate, nickel hydroxide, nickel phosphate, nickel phosphite, nickel formate, nickel fumarate, nickel sulphide, nickel molybdate, nickel tungstate, nickel oxide, nickel alloys such as nickel-molybdenum alloys, Raney nickel, or mixtures thereof.

In one embodiment, the Promoter metal $M^P$ is selected from the group of IIB and VIA metals such as zinc, cadmium, mercury, germanium, tin or lead, and combinations thereof, in their elemental, compound, or ionic form. In yet another embodiment, the Promoter metal $M^P$ further comprises at least one of Ni, Co, Fe and combinations thereof, in their elemental, compound, or ionic form.

In one embodiment, the Promoter metal compound is a zinc compound which is at least partly in the solid state, e.g., a zinc compound poorly soluble in water such as zinc carbonate, zinc hydroxide, zinc phosphate, zinc phosphite, zinc formate, zinc fumarate, zinc sulphide, zinc molybdate, zinc tungstate, zinc oxide, zinc alloys such as zinc-molybdenum alloys.

In an embodiment, the Promoter metal is a Group IIA metal compound, selected from the group of magnesium, calcium, strontium and barium compounds which are at least partly in the solid state, e.g., a water-insoluble compound such as a carbonate, hydroxide, fumarate, phosphate, phosphite, sulphide, molybdate, tungstate, oxide, or mixtures thereof.

In one embodiment, the Promoter metal compound is a tin compound which is at least partly in the solid state, e.g., a tin compound poorly soluble in water such as stannic acid, tin phosphate, tin formate, tin acetate, tin molybdate, tin tungstate, tin oxide, tin alloys such as tin-molybdenum alloys.

Group VIB Metal Component:

The Group VIB metal ($M^{VIB}$) compound can be added in the solid, partially dissolved, or solution state. In one embodiment, the Group VIB metal compound is selected from molybdenum, chromium, tungsten compounds, and combinations thereof. Examples of such compounds include, but are not limited to, alkali metal, alkaline earth, or ammonium metallates of molybdenum, tungsten, or chromium, (e.g., ammonium tungstate, meta-, para-, hexa-, or polytungstate, ammonium chromate, ammonium molybdate, iso-, peroxo-, di-, tri-, tetra-, hepta-, octa-, or tetradecamolybdate, alkali metal heptamolybdates, alkali metal orthomolybdates, or alkali metal isomolybdates), ammonium salts of phosphomolybdic acids, ammonium salts of phosphotunstic acids, ammonium salts of phosphochromic acids, molybdenum (di- and tri) oxide, tungsten (di- and tri) oxide, chromium or chromic oxide, molybdenum carbide, molybdenum nitride, aluminum molybdate, molybdic acid, chromic acid, tungstic acid, Mo—P heteropolyanion compounds, Wo—Si heteropolyanion compounds, W—P heteropolyanion compounds. W—Si heteropolyanion compounds, Ni—Mo—W heteropolyanion compounds, Co—Mo—W heteropolyanion compounds, or mixtures thereof, added in the solid, partially dissolved, or solute state.

Chelating Agent (Ligand) L:

In one embodiment, the catalyst precursor composition comprises at least a non-toxic organic oxygen containing ligand with an LD50 rate (as single oral dose to rats) of greater than 500 mg/Kg. In a second embodiment, the organic oxygen containing ligand L has an LD50 rate of >700 mg/Kg. In a third embodiment, organic oxygen containing chelating agent has an LD50 rate of >1000 mg/Kg. As used herein, the term "non-toxic" means the ligand has an LD50 rate (as single oral dose to rats) of greater than 500 mg/Kg. As used herein the term "at least an organic oxygen containing ligand" means the composition may have more than one organic oxygen containing ligand in some embodiments, and some of the organic oxygen containing ligand may have an LD50 rate of <500 mg/Kg, but at least one of the organic oxygen containing ligands has an LD50 rate of >500 mg/Kg.

In one embodiment, the oxygen-containing chelating agent L is selected from the group of non-toxic organic acid addition salts such as formic acid, acetic acid, propionic acid, maleic acid, fumaric acid, succinic acid, tartaric acid, citric acid, oxalic acid, glyoxylic acid, aspartic acid, alkane sulfonic acids such as methane sulfonic acid and ethane sulfonic acid, aryl sulfonic acids such as benzene sulfonic acid and p-toluene sulfonic acid and arylcarboxylic acids such as benzoic acid. In one embodiment, the oxygen-containing chelating agent L is maleic acid (LD of 708 mg/kg).

In one another embodiment, the non-toxic chelating agent L is selected from the group of glycolic acid (having an LD50 of 1950 mg/kg), lactic acid (LD50 of 3543 mg/kg), tartaric acid (LD50 of 7500 mg/kg), malic acid (LD50 of 1600 mg/kg), citric acid (LD50 of 5040 mg/kg), gluconic acid (LD50 of 10380 mg/kg), methoxy-acetic acid (LD50 of 3200 mg/kg), ethoxy-acetic acid (LD50 of 1292 mg/kg), malonic acid (LD 50 of 1310 mg/Kg), succinic acid (LD 50 of 500 mg/kg), fumaric acid (LD50 of 10700 mg/kg), and glyoxylic (LD 50 of 3000 mg/kg). In yet embodiment the non-toxic chelating agent is selected from the group of organic sulfur compounds including but not limited to mercapto-succinic acid (LD 50 of 800 mg/kg) and thio-diglycolic acid (LD 50 of 500 mg/kg).

In yet another the oxygen containing ligand L is a carboxylate containing compound. In one embodiment, the carboxylate compound contains one or more carboxylate functional groups. In yet another embodiment, the carboxylate compound comprises monocarboxylates including, but not limited to, formate, acetate, propionate, butyrate, pentanoate, and hexanoate and dicarboxylates including, but not limited to, oxalate, malonate, succinate, glutarate, adipate, malate, maleate, fumarate, and combinations thereof. In a fourth embodiment, the carboxylate compound comprises maleate.

The organic oxygen containing ligands can be mixed with the Promoter metal containing solution or mixture, the Group VIB metal containing solution or mixture, or a combination of the Promoter metal and Group VIB metal containing precipitates, solutions, or mixtures. The organic oxygen containing ligands can be in a solution state, with the whole amount of the organic oxygen containing ligands dissolved in a liquid such as water. The organic oxygen containing ligands can be partially dissolved and partially in the solid state during mixing with the Promoter metal(s), Group VIB metal(s), and combinations thereof.

Diluent Component:

The term diluent may be used interchangeably with binder. The use of diluent is optional in the making of the catalyst precursor.

In one embodiment, a diluent is included in the process for making the catalyst precursor composition. Generally, the diluent material to be added has less catalytic activity than the catalyst prepared from the catalyst precursor composition (without the diluent) or no catalytic activity at all. Consequently in one embodiment, by adding a diluent, the activity of the catalyst can be reduced. Therefore, the amount of diluent to be added in the process generally depends on the desired activity of the final catalyst composition. Diluent amounts from 0-95 wt. % of the total composition can be suitable, depending on the envisaged catalytic application.

The diluent can be added to the Promoter metal component(s), Promoter metal containing mixtures, Group VIB metal(s) or metal containing mixtures either simultaneously or one after the other. Alternatively, the Promoter metal and Group VIB metal mixtures can be combined together, and subsequently a diluent can be added to the combined metal mixtures. It is also possible to combine part of the metal mixtures either simultaneously or one after the other, to subsequently add the diluent and to finally add the rest of the metal mixtures either simultaneously or one after the other. Furthermore, it is also possible to combine the diluent with metal mixtures in the solute state and to subsequently add a metal compound at least partly in the solid state. The organic oxygen containing ligand is present in at least one of the metal containing mixtures.

In one embodiment, the diluent is composited with a Group VIB metal and/or a Promoter metal, prior to being composited with the bulk catalyst precursor composition and/or prior to being added during the preparation thereof. Compositing the diluent with any of these metals in one embodiment is carried out by impregnation of the solid diluent with these materials.

Diluent materials include any materials that are conventionally applied as a diluent or binder in hydroprocessing catalyst precursors. Examples include silica, silica-alumina, such as conventional silica-alumina, silica-coated alumina and alumina-coated silica, alumina such as (pseudo)boehmite, or gibbsite, titania, zirconia, cationic clays or anionic clays such as saponite, bentonite, kaoline, sepiolite or hydrotalcite, or mixtures thereof. In one embodiment, binder materials are selected from silica, colloidal silica doped with aluminum, silica-alumina, alumina, titanic, zirconia, or mixtures thereof.

These diluents can be applied as such or after peptization. It is also possible to apply precursors of these diluents that, during the process, are converted into any of the above-described diluents. Suitable precursors are, e.g., alkali metal or ammonium aluminates (to obtain an alumina diluent), water glass or ammonium- or acid-stabilized silica sols (to obtain a silica diluent), a mixture of aluminates and silicates (to obtain a silica alumina diluent), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or mixtures thereof.

Other Optional Components:

If desired, other materials, including other metals can be added in addition to the components described above. These materials include any material that is added during conventional hydroprocessing catalyst precursor preparation. Suitable examples are phosphorus compounds, borium compounds, additional transition metals, rare earth metals, fillers, or mixtures thereof. Suitable phosphorus compounds include ammonium phosphate, phosphoric acid, or organic phosphorus compounds. Phosphorus compounds can be added at any stage of the process steps. Suitable additional transition metals that can be added to the process steps include are, e.g., rhenium, ruthenium, rhodium, iridium, chromium, vanadium, iron, cobalt, nickel, zinc, platinum, palladium, cobalt, etc. In one embodiment, the additional metals are applied in the form of water-insoluble compounds. In another embodiment, the additional metals are added in the form of water soluble compounds. Apart from adding these metals during the process, it is also possible to composite the final catalyst precursor composition therewith the optional materials. It is, e.g., possible to impregnate the final catalyst precursor composition with an impregnation solution comprising any of these additional materials.

Methods for Making Hydroprocessing Catalyst Precursor:

The preparation method allows systematic varying of the composition and structure of the catalyst precursor by controlling the relative amounts of the elements, the types of the reagents, and the length and severity of the various reactions and reaction steps.

The order of addition of the reagents used in forming the catalyst precursor is not important. For example, organic oxygen containing ligand can be combined with a mixture of Promoter metal(s) and Group VIB metal(s) prior to precipitation or cogelation. The organic oxygen containing ligand can be mixed with a solution of a Promoter metal, and then added to a solution of one or more Group VIB metals. The organic oxygen containing ligand can be mixed with a solution of one or more Group VIB metals and added to a solution of one or more Promoter metals.

Forming a Precipitate or Cogel with Group VIB/Promoter Metals:

In one embodiment of the process, the first step is a precipitation or cogelation step, which involves reacting in a mixture the Promoter metal component(s) in solution and the Group VIB metal component in solution to obtain a precipitate or cogel. The precipitation or cogelation is carried out at a temperature and pH which the Promoter metal compound and the Group VIB metal compound precipitate or form a cogel. An organic oxygen containing ligand in solution or at least partially in solution is then combined with the precipitate or cogel to form an embodiment of the catalyst precursor.

In an embodiment, the temperature at which the catalyst precursor is formed is between 50-150° C. If the temperature is below the boiling point of the protic liquid, such as 100° C. in the case of water, the process is generally carried out at atmospheric pressure. Above this temperature, the reaction is generally carried out at increased pressure, such as in an autoclave. In one embodiment, the catalyst precursor is formed at a pressure between 0 to 3000 psig. In a second embodiment, between 100 to 1000 psig.

The pH of the mixture can be changed to increase or decrease the rate of precipitation or cogelation, depending on the desired characteristics of the product. In one embodiment, the mixture is kept at its natural pH during the reaction step(s). In another embodiment, the pH is maintained in the range of 0-12. In another embodiment, between 4-10. In a further embodiment, the pH ranges between 7-10. Changing the pH can be done by adding base or acid to the reaction mixture, or adding compounds, which decompose upon temperature increase into hydroxide ions or $H^+$ ions that respectively increase or decrease the pH. Examples include urea, nitrites, ammonium hydroxide, mineral acids, organic acids, mineral bases, and organic bases.

In one embodiment, the reaction of Promoter metal component(s) is carried out with water-soluble metal salts, e.g., zinc, molybdenum and tungsten metal salts. The solution can further comprise other Promoter metal component(s), e.g., cadmium or mercury compounds such as $Cd(NO_3)_2$ or $(CH_3CO_2)_2Cd$, Group VIII metal components including cobalt or iron compounds such as $Co(NO_3)_2$ or $(CH_3CO_2)_2Co$, as well as other Group VIB metal component(s) such as chromium.

In one embodiment, the reaction of Promoter metal component(s) is carried out with water-soluble tin, molybdenum and tungsten metal salts. The solution can further comprise other Group IVA metal component(s), e.g. lead compounds such as $Pb(NO_3)_4$ or $(CH_3CO_2)_2Pb$, as well as other Group VIB metal compounds such as chromium compounds.

The reaction is carried with the appropriate metal salts resulting in precipitate or cogel combinations of zinc/molybdenum/tungsten, tin/molybdenum/tungsten, zinc/molybdenum, zinc/tungsten, tin/molybdenum, tin/tungsten, or zinc/tin/molybdenum/tungsten, or nickel/molybdenum/tungsten, cobalt/molybdenum/tungsten, nickel/molybdenum, nickel/tungsten, cobalt/molybdenum, cobalt/tungsten, or nickel/cobalt/molybdenum/tungsten. An organic oxygen containing ligand can be added prior to or after precipitation or cogelation of the Promoter metal compounds and/or Group VIB metal compounds.

The metal precursors can be added to the reaction mixture in solution, suspension or a combination thereof. If soluble salts are added as such, they will dissolve in the reaction mixture and subsequently be precipitated or cogeled. The solution can be heated optionally under vacuum to effect precipitation and evaporation of the water.

After precipitation or cogelation, the catalyst precursor can be dried to remove water. Drying can be performed under atmospheric conditions or under an inert atmosphere such as nitrogen, argon, or vacuum. Drying can be effected at a temperature sufficient to remove water but not removal of organic compounds. Preferably drying is performed at about 120° C. until a constant weight of the catalyst precursor is reached.

Forming a Precipitate with Optional Binder Component(s):

In one embodiment with the use of a binder, the binder components can be added to the reaction mixture containing the metal precursors in solution, suspension or a combination thereof, forming precipitation or cogelation. The precipitate is subsequently dried to remove water.

In one embodiment with the use of magnesium aluminosilicate clay as a binder, a first reaction mixture is formed comprising a silicon component, an aluminum component, a magnesium component, the Promoter metal compounds and/or Group VIB metal compounds. In one embodiment, the first reaction mixture is formed under ambient pressure and temperature conditions. In one embodiment, the reaction is under a pressures ranging from 0.9 bar and 1.2 bar, and a temperature between about 0° C. and 100° C.

Examples of silicon components include, but are not limited to sodium silicate, potassium silicate, silica gels, silica sols, silica gels, hydronium- or ammonium-stabilized silica sols, and combinations thereof. Examples of aluminum components aluminum useful in the process of the present invention include, but are not limited to, sodium aluminate, potassium aluminate, aluminum sulfate, aluminum nitrate, and combinations thereof. Examples of magnesium components useful in the process of the present invention include, but are not limited to, magnesium metal, magnesium hydroxide, magnesium halides, magnesium sulfate, and magnesium nitrate. In one embodiment, a sufficient amount of an acid is added to the mixture containing the metal precursors and the binder components to adjust the pH of the mixture to about 1 to about 6, forming a first reaction mixture.

After the formation of the first reaction mixture, an alkali base is added to form a second reaction mixture. Examples of alkali base include, but are not limited to, ammonium hydroxide, sodium hydroxide and potassium hydroxide. Sufficient alkali base is added to the first reaction mixture for the pH of the resulting second reaction mixture between about 7 to about 12. The second reaction mixture is then reacted for sufficient time and at sufficient temperature to form a catalyst precursor incorporating at least a clay as a binder. In embodiments, the time is at least one second. In a second embodiment, 15 minutes. A third embodiment, at least 30 minutes. The temperature of the second reaction mixture can range from about 0° C. to about 100° C. The reaction can be done at ambient pressure, although higher or lower pressures are not excluded.

In one embodiment with magnesium aluminosilicate clay as a binder, the ratio of silicon to aluminum to magnesium can be expressed in terms of elemental mole ratios: aSi:bAl:cMg. wherein "a" has a value from 3 to 8, "b" has a value from 0.6 to 1.6, and "c" has a value of from 3 to 6.

Characterization of the Catalyst Precursor:

Characterization of the charge-neutral catalyst precursor can be performed using techniques known in the art, including, but not limited to, powder x-ray diffraction (PXRD), elemental analysis, surface area measurements, average pore size distribution, average pore volume. Porosity and surface area measurements can be performed using BJH analysis under B.E.T. nitrogen adsorption conditions.

Characteristics of the Catalyst Precursor:

In one embodiment, the catalyst precursor has an average pore volume of 0.05-5 ml/g as determined by nitrogen adsorption. In another embodiment, the average pore volume is 0.1-4 ml/g. In a third embodiment, 0.1-3 ml/g.

In one embodiment, the catalyst precursor has a surface area of at least 10 $m^2/g$. In a second embodiment, a surface area of at least 50 $m^2/g$. In a third embodiment, a surface area of at least 150 $m^2/g$.

In one embodiment, the catalyst precursor has an average pore size, as defined by nitrogen adsorption, of 2-50 nanometers. In a second embodiment, an average pore size of 3-30 nanometers. In a third embodiment, an average pore size of 4-15 nanometers.

In one embodiment with the inclusion of magnesium aluminosilicate clay as a binder, the catalyst precursor is a layered material composed of a stack of elemental clay platelets.

Shaping Process:

In one embodiment, the catalyst precursor composition can generally be directly formed into various shapes depending on the intended commercial use. These shapes can be made by any suitable technique, such as by extrusion, pelletizing, beading, or spray drying. If the amount of liquid of the bulk catalyst precursor composition is so high that it cannot be directly subjected to a shaping step, a solid-liquid separation can be performed before shaping.

Addition of Pore Forming Agents

The catalyst precursor can be mixed with a pore forming agent including, but not limited to steric acid, polyethylene glycol polymers, carbohydrate polymers, methacrylates, and cellulose polymers. For example, the dried catalyst precursor can be mixed with cellulose containing materials such as methylcellulose, hydroxypropylcellulose, or other cellulose ethers in a ratio of between 100:1 and 10:1 (wt. % catalyst precursor to wt. % cellulose) and water added until a mixture of extrudable consistency is obtained. Examples of commercially available cellulose based pore forming agents include but are not limited to: methocel (available from Dow Chemical Company), avicel (available from FMC Biopolymer), and porocel (available from Porocel). The extrudable mixture can be extruded and then optionally dried. In one embodiment, the drying can be performed under an inert atmosphere such as nitrogen, argon, or vacuum. In another embodiment, the drying can be performed at elevated temperatures between 70 and 200° C. In yet another embodiment, the drying is performed at 120° C.

Sulfiding Agent Component:

The charge-neutral catalyst precursor can be sulfided to form an active catalyst. In one embodiment, the sulfiding agent is elemental sulfur by itself. In another embodiment, the sulfiding agent is a sulfur-containing compound which under prevailing conditions, is decomposable into hydrogen sulphide. In yet a third embodiment, the sulfiding agent is $H_2S$ by itself or $H_2S$ in $H_2$.

In one embodiment, the sulfiding agent is selected from the group of ammonium sulfide, ammonium polysulfide ($[(NH_4)_2S_x)$, ammonium thiosulfate (($NH_4)_2S_2O_3$), sodium thiosulfate $Na_2S_2O_3$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), and the like. In another embodiment, the sulfiding agent is selected from alkali- and/or alkaline earth metal sulfides, alkali- and/or alkaline earth metal hydrogen sulfides, and mixtures thereof. The use of sulfiding agents containing alkali- and/or alkaline earth metals can require an additional separation process step to remove the alkali- and/or alkaline earth metals from the spent catalyst.

In one embodiment, the sulfiding agent is ammonium sulfide in aqueous solution, which aqueous ammonium sulfide solution can be synthesized from hydrogen sulfide and ammonia refinery off-gases. This synthesized ammonium sulfide is readily soluble in water and can easily be stored in aqueous solution in tanks prior to use. In one embodiment wherein the sulfidation is with an aqueous ammonium sulfide solution, and also in the presence of at least a sulfur additive selected from the group of thiodazoles, thio acids, thio amides, thiocyanates, thio esters, thio phenols, thiosemicarbazides, thioureas, mercapto alcohols, and mixtures thereof.

In one embodiment, hydrocarbon feedstock is used as a sulfur source for performing the sulfidation of the catalyst precursor. Sulfidation of the catalyst precursor by a hydrocarbon feedstock can be performed in one or more hydrotreating reactors during hydrotreatment.

In one embodiment, the sulfiding agent is present in an amount in excess of the stoichiometric amount required to form the sulfided catalyst from the catalyst precursor. In another embodiment, the amount of sulfiding agent represents a sulphur to Group VIB metal mole ratio of at least 3 to 1 to produce a sulfided catalyst from the catalyst precursor. In a third embodiment, the total amount of sulfur-containing compound is generally selected to correspond to any of about 50-300%, 70-200%, and 80-150%, of the stoichiometric sulfur quantity necessary to convert the metals into for example, $Co_9S_8$, $MoS_2$, $WS_2$, $Ni_3S_2$, etc.

Sulfiding Step:

Sulfiding (sometimes referred to as "presulfiding") of the catalyst precursor to form the catalyst can be performed prior to introduction of the catalyst into a hydrotreating reactor (thus ex-situ sulfiding). In another embodiment, the sulfiding is in-situ. In one embodiment with the sulfiding process being done ex-situ, the formation of undesirable compounds in the hydrotreating unit is prevented. In one embodiment, the catalyst precursor is converted into an active catalyst upon contact with the sulfiding agent at a temperature ranging from 70° C. to 500° C., from 10 minutes to 15 days, and under a $H_2$-containing gas pressure. If the sulfidation temperature is below the boiling point of the sulfiding agent, such as 60-70° C. in the case of ammonium sulphide solution, the process is generally carried out at atmospheric pressure. Above the boiling temperature of the sulfiding agent/optional components, the reaction is generally carried out at an increased pressure.

In one embodiment, the sulfiding can be carried out in the gaseous phase with hydrogen and a sulfur-containing compound which is decomposable into $H_2S$. Examples include mercaptanes, $CS_2$, thiophenes, DMS, DMDS and suitable S-containing refinery outlet gasses. The use of $H_2S$ alone is sufficient. The contacting between the catalyst precursor in gaseous phase with hydrogen and a sulfur-containing compound can be done in one step at a temperature between 125° C. to 450° C. (257° F. to 842° F.) in one embodiment, and between 225° C. to 400° C. (437° F. to 752° F.) in another embodiment. In one embodiment, the sulfidation is carried out over a period of time with the temperature being increased in increments, e.g., from 0.5 to 4° C. (0.9 to 7.2° F.) per min. and held over a period of time, e.g., from 1 to 12 hours, until completion.

As used herein, completion of the sulfidation process means that at least 95% of stoichiometric sulfur quantity necessary to convert the metals into for example, $CO_{958}$, $MoS_2$, $WS_2$, $Ni_3S_2$, etc., has been used up.

In another embodiment of sulfidation in the gaseous phase, the sulfidation is done in two or more steps, with the first step being at a lower temperature than the subsequent step(s). For example, the first step is at about 100 to 250° C. (212° F. to 482° F.), preferably about 125 to 225° C. (257° F. to 437° F.). After a short period of time, e.g., from ½ to 2 hours (temperature kept at a plateau). The second step can be carried out at about 225 to 450° C. (437° F. to 842° F.), and preferably about 250 to 400° C. (482° F. to 752° F.). The total pressure during the sulfidation step can be between atmospheric and about 10 bar (1 MPa). The gaseous mixture of $H_2$ and sulfur containing compound can be the same or different in the steps. The sulfidation in the gaseous phase can be done in any suitable manner, including a fixed bed process and a moving bed process (in which the catalyst moves relative to the reactor, e.g., ebullated process and rotary furnace).

In one embodiment, the sulfidation is carried out in the liquid phase. At first, the catalyst precursor is brought in contact with an organic liquid in an amount in the range of 20-500% of the catalyst precursor pore volume. The contacting with the organic liquid can be at a temperature ranging from ambient to 250° C. (482° F.). After the incorporation of an organic liquid, the catalyst precursor is brought into contact with hydrogen and a sulfur-containing compound.

In one embodiment, the organic liquid has a boiling range of about 100-550° C. (212-1022° F.). In another embodiment, the organic liquid is a petroleum fraction such as heavy oils, lubricating oil fractions like mineral lube oil, atmospheric gas oils, vacuum gas oils, straight run gas oils, white spirit, middle distillates like diesel, jet fuel and heating oil, naphthas, and gasoline. In one embodiment, the organic liquid contains less than 10 wt. % sulfur, and preferably less than 5 wt. %.

In one embodiment, the sulfidation (or "start-up") in the liquid phase is done as a "quick" process, with the sulfidation taking place over a period of less than 72 hours and with the ramp-up in temperature ranges from 0.5 to 4° C. (0.9 to 7.2° F.) per min. In a second embodiment, the quick start-up takes less than 48 hours. In a third embodiment, less than 24 hours.

In the quick sulfidation, the contacting between the catalyst precursor in organic liquid with hydrogen and a sulfur-containing compound can be done in one step at a temperature between 150 to 450° C. in one embodiment, and between 225° C. to 400° C. in another embodiment. In yet another embodiment of the quick sulfidation, the sulfidation is done in two or more steps, with the first step being at a lower temperature than the subsequent step(s). For example, the first step is at about 100 to 250° C. (212° F. to 482° F.), or from 125 to 225° C. (257° F. to 437° F.). After a short period of time, e.g., from ½ to 2 hours (temperature kept at a plateau), then the temperature is ramped up for the second step, e.g., from 250 to 450° C. (482° F. to 842° F.), and preferably from 225 to 400° C. (437° F. to 7520° F.). The temperature is maintained from 1 to 36 hours, after which time sulfidation is complete.

In yet another embodiment, the sulfidation in the liquid phase is done as a "slow" process, with the sulfidation taking place over a period of time from four (4) days up to three weeks, i.e., at least 96 hours. In this slow process, the contacting between the catalyst precursor in organic liquid with hydrogen and a sulfur-containing compound is done in two or more steps, with the first step being at a lower temperature than the subsequent step(s) and with the temperature being increased slowly in increments, e.g., per hour instead of per minute as in the quick start up. The gaseous mixture of $H_2$ and sulfur containing compound can be the same or different in the steps. In one embodiment, the first step is at about 100 to 375° C. (212° F. to 707° F.), preferably about 125 to 350° C. (257° F. to 662° F.), with a temperature ramp rate from 0.25 to 4° C. (0.45 to 7.2° F.) per hour. After the first step, temperature is held constant for a period of time from 2 to 24 hours, then ramped up for the second step at a rate from 5 to 20° C. (9 to 36° F.) per hour. In one embodiment, the second step is carried out at about 200 to 450° C. (392° F. to 842° F.), and preferably about 225 to 400° C. (437° F. to 752° F.).

In one embodiment, the sulfiding is done with elemental sulfur, wherein the sulfur is incorporated into the pores of the catalyst precursors. In this process, elemental sulfur is mixed with the catalyst precursor in an amount from 2 to 15 wt. % of the catalyst precursor weight, at a temperature below the melting point of sulfur. In one embodiment, the mixing is at 180 to 210° F. (82° to 99° C.). Sequentially or simultaneously with the mixing of precursor and elemental sulfur, the mixture is brought into contact with a high boiling organic liquid. The mixture is then heated to a temperature in the range of 250 to 390° F. (121° to 199° C.) in the presence of nitrogen, producing $H_2S$ and metal sulfides. In one embodiment, the organic liquid is selected from the group consisting of olefins, gasoline, white spirit, diesel, gas oils, mineral lube oils, and white oils.

In one embodiment, it is found that catalysts sulfided from embodiments of the catalyst precursors surprisingly give about the same 700° F.+ conversion rate whether sulfided via the gaseous phase, or in the liquid phase as a "quick" process. In one embodiment, it is found that the 700° F.+ conversion increases at least 25% with the use of catalysts sulfided in the liquid phase and via the "slow" process. In yet another embodiment, the 700° F.+ conversion doubles with a catalyst sulfided via the slow process.

Use of the Catalyst

The multi-metallic catalyst prepared from the catalyst precursor composition can be used in virtually all hydroprocessing processes to treat a plurality of feeds under wide-ranging reaction conditions such as temperatures of from 200 to 450° C., hydrogen pressures of from 15 to 300 bar, liquid hourly space velocities of from 0.05 to 10 h$^{-1}$ and hydrogen treat gas rates of from 35.6 to 2670 m$^3$/m$^3$ (200 to 15000 SCF/B—or "Standard Cubic Feet per Barrel" of hydrocarbon compound feed to the reactor).

The hydroprocessing process can be practiced in one or more reaction zones, and can be practiced in either counter-current flow or co-current flow mode. By countercurrent flow mode is meant a process wherein the feed stream flows countercurrent to the flow of hydrogen-containing treat gas. The hydroprocessing also includes slurry and ebullating bed hydrotreating processes for the removal of sulfur and nitrogen compounds and the hydrogenation of aromatic molecules present in light fossil fuels such as petroleum mid-distillates, e.g., hydrotreating a heavy oil employing a circulating slurry catalyst precursor.

The hydroprocessing process can be single staged or multiple-staged. In one embodiment, the process is a two stage system wherein the first and second stages employ different catalysts, and wherein at least one of the catalysts used in the system is prepared from the catalyst precursor composition of the invention.

The feeds for use in hydroprocessing processes using the catalyst prepared from the catalyst precursor can include petroleum and chemical feedstocks such as olefins, reduced crudes, hydrocrackates, raffinates, hydrotreated oils, atmospheric and vacuum gas oils, coker gas oils, atmospheric and vacuum resids, deasphalted oils, dewaxed oils, slack waxes, Fischer-Tropsch waxes and mixtures thereof. Specific examples range from the relatively light distillate fractions up to high boiling stocks such as whole crude petroleum, reduced crudes, vacuum tower residua, propane deasphalted residua, brightstock, cycle oils, FCC tower bottoms, gas oils including coker gas oils and vacuum gas oils, deasphalted residua and other heavy oils. In one embodiment, the feedstock is a $C_{10+}$ feedstock. In another embodiment, the feedstock is selected from distillate stocks, such as gas oils, kerosenes, jet fuels, lubricating oil stocks boiling above 230° C., heating oils, hydrotreated oil stock, furfural-extracted lubricating oil stock and other distillate fractions whose pour point and viscosity properties need to be maintained within certain specification limits.

In one embodiment, the feedstocks contain a substantial amount of nitrogen, e.g. at least 10 wppm nitrogen, in the form of organic nitrogen compounds. The feeds can also have a significant sulfur content, ranging from about 0.1 wt. % to 3 wt. %, or higher The hydrotreating processes using catalysts prepared from the catalyst precursor can be suitable for making lubricating oil base stocks meeting Group II or Group III base oil requirements. In one embodiment, the catalyst precursor is used in preparing a catalyst for use in a hydroprocessing process producing white oils. White mineral oils, called white oils, are colorless, transparent, oily liquids obtained by the refining of crude petroleum feedstocks.

Catalysts prepared from the catalyst precursor can be applied in any reactor type. In one embodiment, the catalyst is applied to a fixed bed reactor. In another embodiment, two or more reactors containing the catalyst can be used in series. The catalyst can be used as a slurry in an unsupported form or in a supported matrix such as alumina or silica.

In one embodiment, the multi-metallic catalyst prepared from the catalyst precursor is used in a fixed bed hydroprocessing reactor by itself. In another embodiment, the multi-metallic catalyst is in conjunction with at least a different catalyst in a fixed bed reactor, wherein the catalysts are packed in a stacked-bed manner. In one embodiment, the multi-metallic catalyst is employed in a layered/graded system, with a first layer catalyst having larger pore size, and the second layer being an embodiment of the multi-metallic catalyst of the invention.

In one embodiment wherein the multi-metallic catalyst prepared from the catalyst precursor is used in a layered bed system, the multi-metallic catalyst comprises at least 10 vol. % of the total catalyst. In a second embodiment, the multi-metallic catalyst comprises at least 25 vol. % of the catalyst system. In a third embodiment, the multi-metallic catalyst comprises at least 35 vol. % of the layered catalyst system. In a fourth embodiment, the multi-metallic catalyst comprises at least 50 vol. % of a layered bed system. In a fifth embodiment, the multi-metallic catalyst comprises 80 vol. % of a layered bed system.

In one embodiment, the multi-metallic catalyst prepared from the catalyst precursor is characterized as being less susceptible to fouling compared to the catalysts of the prior art when employed in hydrogenation processes, i.e., having a lower fouling rate.

In one embodiment wherein the multi-metallic prepared from the catalyst precursor is employed as the sole catalyst in a reactor system, the multi-metallic catalyst has a fouling rate of less than 8° F. (4.4° C.) per 1000 hour, i.e., that is, the catalytic reactor temperature needs to be increased no more than 8° F. per 1000 hour in order to maintain a target nitrogen level of 20 ppm in the upgraded products of a hydrodenitrogenation (HDN) process. As described in the definition section for fouling rate, the feed in this HDN process is vacuum gas oil (VGO) having properties of 4.6 CSt viscosity at 100° C., 0.928 g/cc density, 178-495° C. boiling range, and 1.66 hydrogen to carbon atomic ratio. The process condition includes a temperature of 370-425° C., 10 MPa pressure, 1.0 $h^{-1}$ LHSV, and hydrogen flow rate of 5000 scfb. The HDN target is a nitrogen level of 20 ppm in the upgraded products.

In yet another embodiment where the multi-metallic catalyst is the sole catalyst, the multi-metallic catalyst has a fouling rate of less than 5° F. (2.8° C.) per 1000 hour. In a third embodiment, the fouling rate is less than 2.5° F. (1.9° C.) per 1000 hour.

In yet another embodiment when employed in a fixed bed hydroprocessing reactor having three layers of three different catalysts and with the multi-metallic catalyst comprising between 10-80 vol., this catalyst system has a fouling rate of less than 30° F. (16.7° C.) per 1000 hour at a target N concentration of 20 wtppm in the upgraded product using a VGO feed as described above (also see Table 3). In a second embodiment, the fouling rate is less than 26° F. (14.4° C.) per 1000 hour for a system wherein the catalyst comprises at least 25 vol. % of the layered catalyst system. In a third embodiment, a catalyst system comprising at least 35 vol. % of the multi-metallic catalyst has a fouling rate of less than 19° F. (10.6° C.) per 1000 hour at the same N target (20 wtppm N in the whole liquid product). In a fourth embodiment, a catalyst system comprising at least 50 vol. % of the multi-metallic catalyst has a fouling rate of less than 10° F. (5.6° C.) per 1000 hour at the same N target (20 wtppm N in the whole liquid product).

In one embodiment, the multi-metallic catalyst based on the precursor of the invention can be used for hydroprocessing under low hydrogen partial pressure, e.g., a hydrocracking process having a hydrogen partial pressure of lower than 600 psig. This is surprising in view of the prior art teachings concerning the adverse effects of low hydrogen partial pressures on catalyst activity. In one embodiment, the multi-metallic catalyst is used for hydroprocessing under a hydrogen partial pressure of less than 500 psig. In a second embodiment, the multi-metallic catalyst is for use under a hydrogen partial pressure between 400 to 600 psig. In a third embodiment, the hydrogen partial pressure is between 400 and 500 psig. The applicability of low pressures employing embodiments of the multi-metallic catalyst is particularly preferred since it results in large savings in construction and operating costs.

In one embodiment of a hydroconversion process under a hydrogen partial pressure of about 400 psig, the multi-metallic catalyst gives a 700° F.+ conversion of at least 50% of the 700° F.+ conversion obtained at a hydrogen partial pressure of about 600 psig. In a second embodiment, 700° F.+ conversion rate at a hydrogen partial pressure of about 400 psig or lower is at least 75% the 700° F.+ conversion obtained at a hydrogen partial pressure of about 600 psig or higher. In a third embodiment, the 700° F.+ conversion rate at a hydrogen partial pressure of about 400 psig or lower is at least 80% the 700° F.+ conversion obtained at a hydrogen partial pressure of about 600 psig or higher.

In one embodiment of a hydroconversion process under a hydrogen partial pressure in the range of 450 to 500 psig, the multi-metallic catalyst based on the precursor of the invention removes at least 70% of the nitrogen removed under comparable conditions, but at hydrogen partial pressure of greater than 2000 psig.

EXAMPLES

The following illustrative examples are intended to be non-limiting.

Example 1

Ni—Mo—W-Maleate Catalyst Precursor

A catalyst precursor of the formula $(NH_4)\{[Ni_{2.6}(OH)_{2.08}(C_4H_2O_4^{2-})_{0.06}](Mo_{0.35}W_{0.65}O_4)_2\}$ was prepared as follows: 52.96 g of ammonium heptamolybdate $(NH_4)_6Mo_7O_{24}\cdot 4H_2O$ was dissolved in 2.4 L of deionized water at room temperature. The pH of the resulting solution was within the range of 5-6. 73.98 g of ammonium metatungstate powder was then added to the above solution and stirred at room temperature until completely dissolved. 90 ml of concentrated $(NH_4)OH$ was added to the solution with constant stirring. The resulting molybdate/tungstate solution was stirred for 10 minutes and the pH monitored. The solution had a pH in the range of 9-10. A second solution was prepared containing 174.65 g of $Ni(NO_3)_2\cdot 6H_2O$ dissolved in 150 ml of deionized water and heated to 90° C. The hot nickel solution was then slowly added over 1 hr to the molybdate/tungstate solution. The resulting mixture was heated to 91° C. and stirring continued for 30 minutes. The pH of the solution was in the range of 5-6. A blue-green precipitate formed and the precipitate was collected by filtration. The precipitate was dispersed into a solution of 10.54 g of maleic acid dissolved in 1.8 L of DI water and heated to 70° C. The resulting slurry was stirred for 30 min. at 70° C., filtered, and the collected precipitate vacuum dried at room temperature overnight. The material was then further dried at 120° C. for 12 hr. The resulting material has a typical XRD pattern with a broad peak at 2.5 Å, denoting an amorphous Ni—OH containing material. The BET Surface area of the resulting material was 101 m$^2$/g, the average pore volume was around 0.12-0.14 cc/g, and the average pore size was around 5 nm.

Example 2

Co—Mo—W-Maleate Catalyst Precursor

A catalyst precursor of the formula $(NH_4)\{[Co_{3.0}(OH)_{3.0-c}(C_4H_2O_4^{2-})_{c/2}](Mo_{0.34}W_{0.66}O_4)_2\}$ was prepared as follows: 2.0 g of maleic acid was dissolved in 800 g of deionized water at room temperature. The pH of the resulting solution was within the range of 2-3. 17.65 g of ammonium heptamolybdate $(NH_4)_6Mo_7O_{24}\cdot 4H_2O$ powder was dissolved in the above solution, followed by addition of 24.67 g of ammonium metatungstate $(NH_4)_6H_2W_{12}O_{40}\cdot xH_2O$ (>66.5% W). The pH of the resulting solution was within the range of 4-5. 30 ml of concentrated $(NH_4)OH$ was added to the solution with constant stirring. The resulting molybdate/tungstate solution was stirred for 10 minutes and the pH monitored. The solution had a pH in the range of 9-10 at room temperature and was heated to 90° C. A second solution was prepared containing 58.28 g of cobalt nitrate dissolved in 50 g of deionized water. The hot cobalt solution was then slowly added over 25 min to the hot molybdate/tungstate solution. The resulting mixture was continuously stirred at 90° C. for 1 hour. The pH of the solution was around 6. A dark purplish brown precipitate that formed in the process was collected by filtration. The precipitate was dispersed into 250 g of DI water at 70° C. The resulting slurry was stirred for 30 min., filtered, and the collected precipitate vacuum dried at room temperature overnight. The material was then further dried at 120° C. for 12 hr.

Example 3

Co—Mo—W catalyst Precursor

A catalyst precursor of the formula $(NH_4)^+\{[CO_{3.31}(OH)_{3.62}](Mo_{0.3}W_{0.7}O_4)_2\}$ was prepared according to the following procedure: 17.65 g of ammonium heptamolybdate $(NH_4)_6Mo_7O_{24}\cdot 4H_2O$ powder was dissolved in 800.00 g of deionized water at room temperature followed by addition of 24.66 g of ammonium metatungstate $(NH_4)_6H_2W_{12}O_{40}\cdot xH_2O$ (>66.5% W). The pH of the resulting solution was within the range of 5.2-5.4. A second solution was prepared containing 58.26 g of cobalt nitrate hexahydrate dissolved in 50.0 g of deionized water. The pH of the resulting solution was within the range of 1-2. 30 ml of concentrated $(NH_4)OH$ was added to the solution with constant stirring. Initially moss green in color precipitate was formed later turning into a 2 layer mixture with a greenish suspension at the bottom and a top brownish layer. The cobalt containing mixture was then slowly added over 25 min to the molybdate/tungstate solution at room temperature. The pH of the resulting solution was within the range of 8-8.5. The mixture was heated to 80° C. and continuously stirred for 1 hour. A purplish grey suspension was filtered while hot. The precipitate was dispersed into 2.5 L of DI water at 70° C. The resulting slurry was stirred for 30 min (pH~7.6), filtered, and the collected precipitate vacuum dried at room temperature overnight. The material was then further dried at 120° C. for 12 hr.

Example 4

Extrusion Process

In this example, 40 g of dried catalyst precursor prepared as per examples 1-3 was mixed with 0.8 g of methocel, (a commercially available methylcellulose and hydroxypropyl methylcellulose polymer from Dow Chemical Company), and approximately 7 g of DI water was added. Another 7 g of water was slowly added until the mixture was of an extrudable consistency. The mixture was then extruded and dried under $N_2$ at 120° C. prior to sulfiding.

Example 5

Sulfidation DMDS Liquid Phase

The catalyst precursors of Examples 1-3 were placed in a tubular reactor. The temperature was raised from room temperature to 250° F. at a rate of 100° F./hr under $N_{2(g)}$ at 8 ft$^3$/hr. The reaction was continued for 1 hour after which time the $N_2$ was switched off and replaced with $H_2$ at 8 ft$^3$/hr and 200 psig for 1 hour. Light VGO oil (end point below 950° F.) was pumped over the catalyst precursor at 250° F. at a rate of 130 cc/hr (1 LHSV) while the hydrogen gas rate at 8 cubic feet an hour was maintained. The catalyst precursor was then heated to 430° F. at a rate of 25° F./hr and dimethyl disulfide (DMDS) was added to the light VGO at a rate of 4 cc/hr for approximately 4 hr. The catalyst precursor was then heated to 600° F., and the rate of DMDS addition increased to 8 cc/hr. The temperature was maintained at 600° F. for 2 hours after which time sulfidation was complete.

Example 6

Sulfidation With DMDS Gas Phase

Catalyst precursors of Examples 1-3 extruded as per example 4 were placed in a tubular reactor. The temperature was raised to 450° F. at a rate of 100° F./hr under $N_{2(g)}$ at 8 ft$^3$/hr. The reaction was continued for 1 hour after which time the $N_2$ was switched off and replaced with $H_2$ at 8 ft$^3$/hr and 100 psig for 1 hour. The $H_2$ pressure was then increased to 300 psig and maintained for less than 1 hr. after which time dimethyl disulfide (DMDS) was added at a rate of 4 cc/hour and then reaction allowed to proceed for 4 hr. The catalyst precursor was then heated to 600° F. and the rate of DMDS addition increased to 8 cc/hr. The temperature was maintained at 600° F. for 2 hours after which time sulfidation was complete.

Example 7

Catalyst/Catalyst Precursor Comparison

In this examples, various catalysts/catalyst precursors were evaluated and compared, including conventional catalysts (Ni—Mo on alumina, Co—Mo—W and Ni—Mo—W unsupported catalysts) and various embodiments of the sulfided catalyst precursors (Co—Mo—W-maleate example 2, Co—Mo—W of example 3, and Ni—Mo—W-maleate example 1). The evaluation included hydrocracking, HDS, and HDN activity using a vacuum gas oil (VGO) feedstock with a boiling point above 700° F., a sulfur content of 31135 ppm, a nitrogen content of 31230 ppm, and other properties as presented in Table 1. The reactor conditions were at a pressure of 2300 psi, an $H_2$ gas rate of 5000 SCFB, and an LHSV of 0.75.

Ni/Mo/alumina is a conventional supported catalyst. Ni/Mo/W is an unsupported catalyst along the line of the catalyst referenced in U.S. Pat. No. 6,712,955 and U.S. Pat. No. 6,299,760. Ni/Mo/W/maleate, Co/Mo/W, and Co/Mo/W/maleate, and are catalyst precursors made per examples 1, 2, and 3 respectively, and sulfided as per example 6. Results of the evaluation are presented in Table 2.

Figure 2:
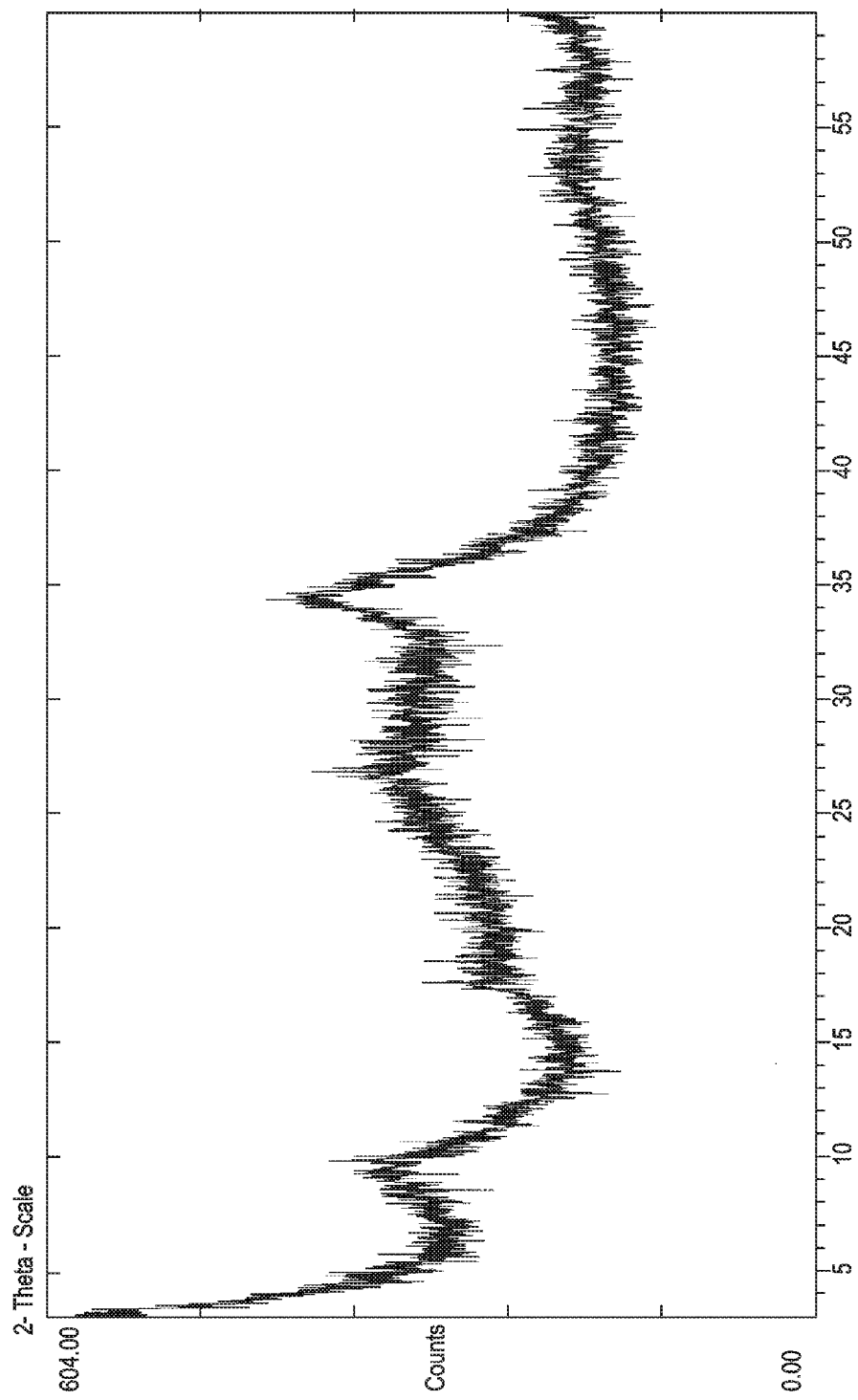
FIG. 2 shows the powder X-ray diffraction pattern of an embodiment of a catalyst precursor compound (based on Ni/Mo/W/maleate).
Figure 3:
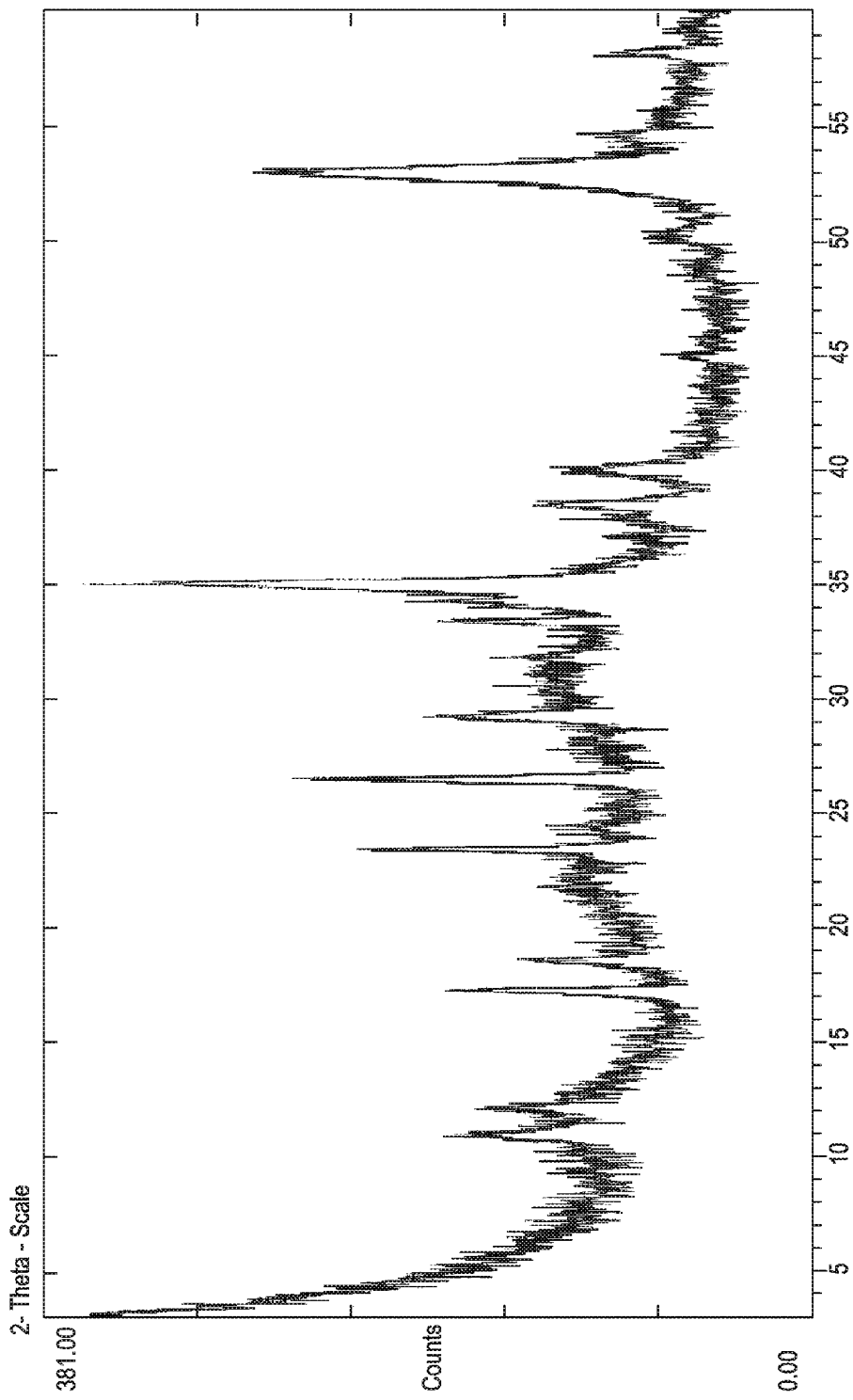
FIG. 3 shows powder X-ray diffraction pattern of a second embodiment of a catalyst precursor compound (based on Co/Mo/W/maleate).
Figure 4:
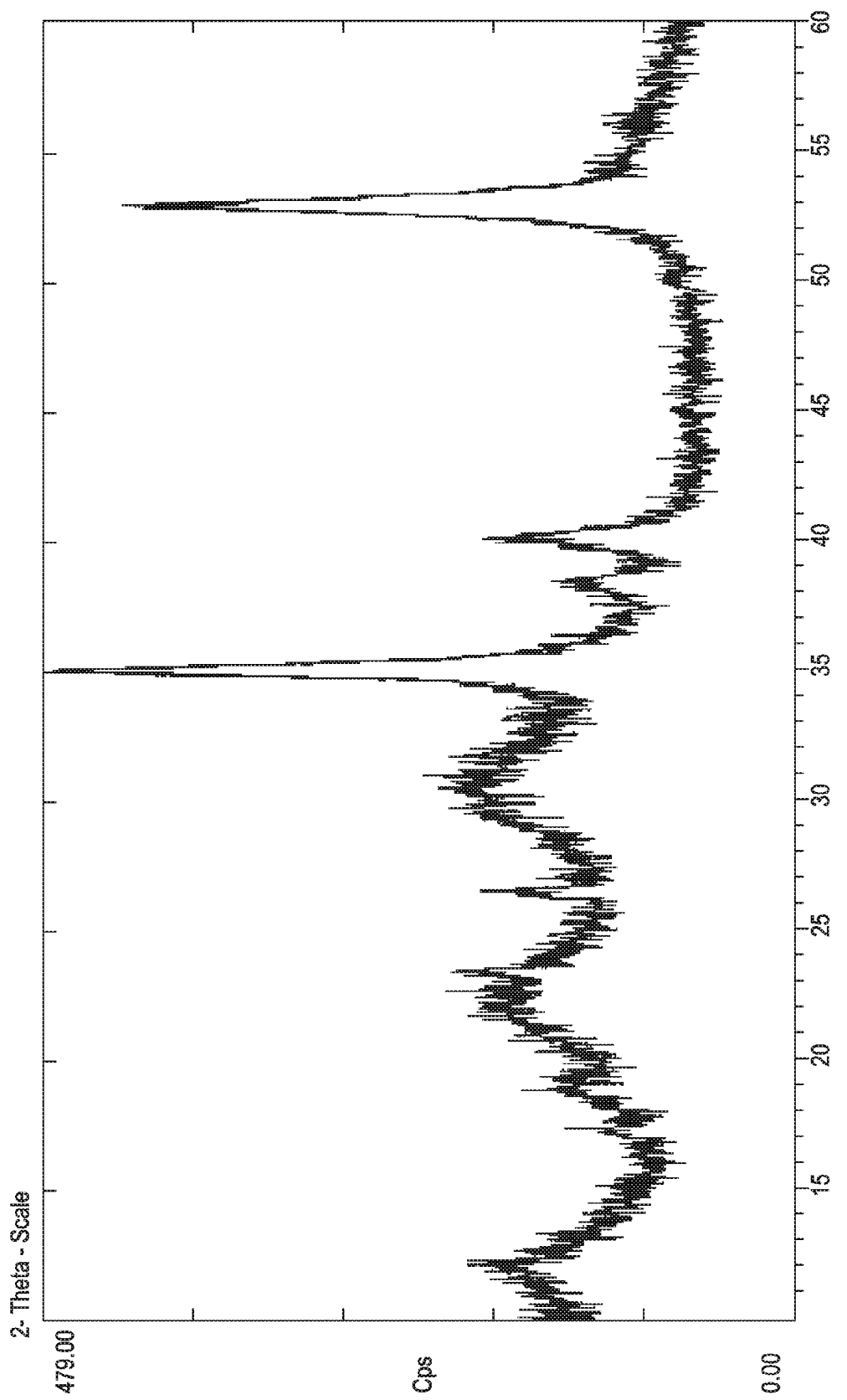
FIG. 4 shows powder X-ray diffraction pattern of a comparative catalyst precursor without maleic acid as a chelating agent (based on Co/Mo/W/maleate).

FIG. 1 is a powder X-ray diffraction pattern ("XRD") of the comparative unsupported catalyst precursor Ni/Mo/W. FIG. 2 is a XRD of the catalyst precursor based on the Ni/Mo/W/maleate of Example 1. FIG. 3 is a XRD of a second embodiment of the invention, a catalyst based on the Co/Mo/W/maleate precursor of example 2. FIG. 4 is a XRD of the comparative catalyst precursor Co/Mo/W of Example 3. In the XRDs figures, the catalyst samples were generally washed in DI water for 10-15 minutes to wash off any unreactive salts prior to the XRD.

TABLE 1

| Properties | VGO Feedstock |
|---|---|
| API Gravity | 20.0 |
| N, ppm | 1100 |
| S, wt % | 2.72 |
| Carbon, wt % | 85.6 |
| 22 compounds | |
| Aromatics, vol % | 35.0 |
| Naphthenes, vol % | 27.8 |
| Paraffins, vol % | 13.5 |
| Sulfur compounds, vol % | 23.7 |
| Simdist, wt % | |
| 0.5/5 | 640/689 |
| 10/30 | 717/800 |
| 50/ | 866 |
| 70/90 | 930/1013 |
| 95/99 | 163/1168 |

TABLE 2

| | Feedstock | Ni/Mo/alumina | Ni/Mo/W | Ni/Mo/W/maleate | Co/Mo/W | Co/Mo/W/maleate |
|---|---|---|---|---|---|---|
| 700 F.+ conversion (wt-%/wt-%) | | 34.1 | 30.0 | 30.0 | 20.7 | 31.1 |
| Temperature (° F.) | | 725 | 700 | 690 | 700 | 700 |
| No Loss yields, Wt % | | | | | | |
| C4 minus | 0.0 | 1.1 | 0.9 | 0.5 | 0.6 | 1.0 |
| C5-180° F. | 0.0 | 1.0 | 0.7 | 1.6 | 0.6 | 0.9 |
| 180-700° F. | 6.5 | 36.2 | 32.77 | 32.05 | 24.35 | 33.43 |
| 700° F.+ | 93.5 | 62.2 | 66.0 | 64.1 | 74.8 | 65.1 |
| Sulfur, ppm | 2.7E+04 | 7.5 | 8.3 | 8 | 281.4 | 126.8 |
| Nitrogen, ppm | 1.2E+03 | <0.25 | 1.2 | 1 | 17.4 | 4.0 |

As shown in the table, when the Group VIII metal was nickel, the addition of an organic oxygen containing ligand to the synthesis of the catalyst precursor improved the catalytic activity by lowering the 30% conversion temperature from 725 (conventional Ni—Mo-alumina) and 700 (Ni—Mo—W prior art) to 690 (Ni—Mo—W-maleate). When the group VIII metal was cobalt, the same trend was evident with increased activity when an organic oxygen containing ligand (maleate) was added to the catalyst precursor preparation.

Example 8

HDN Systems Employing Catalyst

Performance of a catalyst employing an embodiment of the catalyst precursor was evaluated in a hydrodenitrogenation (HDN) system.

Comparative Catalyst System I employs two layers. The first layer comprises 20 vol. % of Catalyst A, a commercially available high-activity catalyst for hydrocracking pretreat applications from Chevron Lummus Global of San Ramon, Calif. of a pore size in the range of from 80 to 100 angstroms (Å). The second layer comprises 80 vol. % of another commercially available high-activity catalyst for hydrocracking pretreat applications, Catalyst B, also from Chevron Lummus Global, with a smaller pore size in the range of from 70 to 90 Å.

Catalyst System II employs an embodiment of a multimetallic catalyst using the catalyst precursor in a layered system. The top layer comprises 20 vol. % of Catalyst A, the middle layer comprises 55 vol. % of Catalyst B, and the bottom layer comprises 25 vol. % of a catalyst prepared from the catalyst precursor of Example 1.

The catalyst precursors in this example were sulfided using a liquid phase sulfiding procedure, i.e., extended contacting of the catalyst with the sulfiding feed (e.g., dimethyl disulfide in diesel or light VGO as in Example 5) at about 175-250° F., followed by slow ramping of reactor temperature to 550-700° F.

In both systems, after sulfiding, the system total pressure was increased to 1500 psig and changed over to a straight run light VGO feed. The reactor temperature was increased to 620° F. and held relatively steady for three days. After that, the reactor temperature was increased to 700-780° F., and the system was run at 1500 psig total pressure (1400 psia $H_2$ at the reactor inlet); 5000 SCF/B once through $H_2$ feed, and 1.0 $h^{-1}$ LHSV. A petroleum feedstock having properties as listed in Table 3 was processed through both catalyst systems for a hydrotreating (or HDT) target of 20 wtppm N in the whole liquid product ("WLP").

TABLE 3

Feedstock used for fouling rate testing

| Properties | Feedstock |
|---|---|
| API Gravity | 20.9 |
| N, ppm | 2600 |
| S, wt % | 0.82 |
| Carbon, wt % | 86.69 |
| Hydrogen (NMR), wt % | 12.00 |
| 22 compounds | |
| Aromatics, vol % | 42.4 |
| Naphthenes, vol % | 38.8 |
| Paraffins, vol % | 9.8 |
| Sulfur compounds, vol % | 9.0 |
| Oxygen by NAA, wt % | 0.30 |
| Simdist, wt % | |
| 0.5/5 | 353/533 |
| 10/30 | 579/673 |
| 50/ | 747 |
| 70/90 | 816/871 |
| 95/99 | 890/923 |

Table 4 lists the yields and product properties of the HDN runs comparing the two systems after 480 hours on stream. The results showed that the system II employing the catalyst made with an embodiment of the catalyst precursor demonstrates at least 20° F. more active in HDN (hydrodenitrogenation) activity than the catalyst system I with the prior art. For example, Catalyst System II gave 17.7 ppm nitrogen in the stripper bottoms product with a C.A.T. of 731° F. at 480 hours, wherein Comparative Catalyst System I gave 17.5 ppm nitrogen for a C.A.T. of 751° F. at 504 hours.

Figure 5:
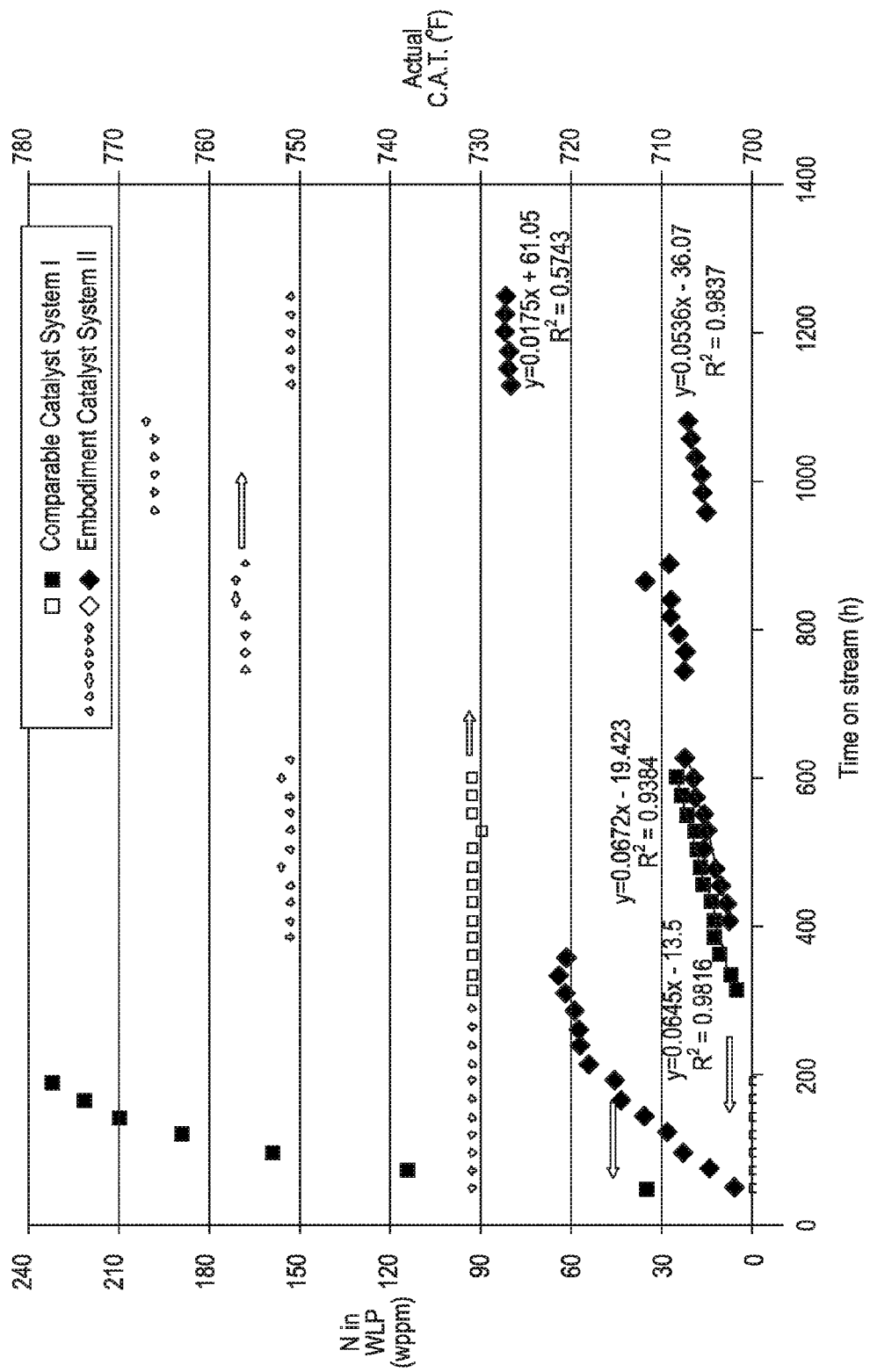
FIG. 5 is a graph comparing the catalyst average temperature (C.A.T.) profile of an embodiment of a multi-metallic catalyst employing the catalyst precursor compound of the invention vs. a catalyst system in the prior art. The C.A.T. profile here is the C.A.T. required over time on stream to maintain 20 wtppm nitrogen in the upgraded product.

FIG. 5 further illustrates/compares the fouling rate of the two catalyst systems, System I with the prior art catalysts, and System II comprising a catalyst made from an embodiment of the catalyst precursor. As shown, Comparative Catalyst System I has a fouling rate of 32° F. per 1000 hours as opposed to Catalyst System II with a fouling rate of 26° F. per 1000 hours. At the end of the run, the C.A.T. of both systems had to be raised to get the same desired HDN conversion rate, i.e., less than 20 wtppm N in the WLP. For System II, the C.A.T. was raised to 741° F. at 888 hours vs. 766° F. at 1008 hours for System I.

Example 9

HDN Systems Employing Catalyst

Performance of a catalyst employing an embodiment of the catalyst precursor was evaluated in a hydrodenitrogenation (HDN) system.

Comparative Catalyst System I employs two layers. The first layer comprises 20 vol. % of Catalyst A, a commercially available high-activity catalyst for hydrocracking pretreat applications from Chevron Lummus Global of San Ramon, Calif. of a pore size in the range of from 80 to 100 angstroms (Å). The second layer comprises 80 vol. % of another commercially available high-activity catalyst for hydrocracking pretreat applications, Catalyst B, also from Chevron Lummus Global, with a smaller pore size in the range of from 70 to 90 Å.

Catalyst System II employs an embodiment of a multi-metallic catalyst using the catalyst precursor in a layered system. The top layer comprises 20 vol. % of Catalyst A, the middle layer comprises 55 vol. % of Catalyst B, and the bottom layer comprises 25 vol. % of a catalyst prepared from the catalyst precursor of Example 1.

The catalyst precursors in this example were sulfided using a liquid phase sulfiding procedure, i.e., extended contacting of the catalyst with the sulfiding feed (e.g., dimethyl disulfide in diesel or light VGO as in example 5) at about 175-250° F., followed by slow ramping of reactor temperature to 550-700° F.

In both systems, after sulfiding, the system total pressure was increased to 1500 psig and changed over to a straight run light VGO feed. The reactor temperature was increased to 620° F. and held relatively steady for three days. After that, the reactor temperature was increased to 700-780° F., and the system was run at 1500 psig total pressure (1400 psig $H_2$ at the reactor inlet); 5000 SCF/B once through $H_2$ feed, and 1.0 $h^{-1}$ LHSV. A petroleum feedstock having properties as listed in Table 3 was processed through both catalyst systems for a hydrotreating (or HDT) target of 20 wtppm N in the whole liquid product ("WLP").

Table 4 lists the yields and product properties of the HDN runs comparing the two systems after 480 hours on stream. The results showed that the system II employing the catalyst made with an embodiment of the catalyst precursor demonstrates at least 20° F. more active in HDN (hydrodenitrogenation) activity than the catalyst system I with the prior art. For example, Catalyst System II gave 17.7 ppm nitrogen in the stripper bottoms product with a C.A.T. of 731° F. at 480 hours, wherein Comparative Catalyst System I gave 17.5 ppm nitrogen for a C.A.T. of 751° F. at 504 hours.

FIG. 5 further illustrates/compares the fouling rate of the two catalyst systems, System I with the prior art catalysts, and System II comprising a catalyst made from an embodiment of the catalyst precursor. As shown, Comparative Catalyst System I has a fouling rate of 32° F. per 1000 hours as opposed to Catalyst System II with a fouling rate of 26° F. per 1000 hours. At the end of the run, the C.A.T. of both systems had to be raised to get the same desired HDN conversion rate, i.e., 20 wtppm N in the WLP. For System II, the C.A.T. was raised to 741° F. at 888 hours vs. 766° F. at 1008 hours for System I.

Example 10

Sulfidation—Slow Sulfidation—DMDS Liquid Phase

The catalyst precursors of Example 1 (Ni—Mo—W-maleate catalyst precursor) was placed in a tubular reactor. The temperature was raised from room temperature to 250° F. at a rate of 100° F./hr under $N_2$ gas at 8 ft$^3$/hr to dry out the catalyst precursors. After about 1 hour, at which time the $N_2$ was switched off and replaced with $H_2$ at 8 ft$^3$/hr and 200 psig for 1 hour. Diesel was pumped over the catalyst precursor at 250° F. at a rate of 130 cc/hr (1 LHSV) while the hydrogen gas rate at 8 cubic feet an hour was maintained. DMDS was added at a rate of 0.4 cc/hr for approximately 40 hours, then increased to 0.8 cc/hr, while the catalyst precursor was slowly heated to 600° F. at a rate of 1.88° F./hr. After reaching 600° F., the catalyst precursor stayed soaked in diesel/DMDS liquid phase for 12 hours, then heated up to 700° F. at a rate of 25° F./hr.

Example 11

Evaluation of Catalysts by Different Sulfidation Processes

This test was similar to Example 7 including evaluations for hydrocracking, HDS, and HDN activity using a vacuum gas oil (VGO) feedstock with properties in Table 3, and reactor conditions at a pressure of 2300 psi, an $H_2$ gas rate of 5000 SCFB, and an LHSV of 0.75. Performance of the catalyst sulfided in Example 9 ("slow" sulfidation process) was compared with conventional catalysts (Ni—Mo on alumina, Co—Mo—W and Ni—Mo—W unsupported catalysts) and embodiments of the catalyst precursors sulfided using a "quick" sulfidation process (Co—Mo—W-maleate of example 2 and Ni—Mo—W-maleate of example 1).

The 700° F.+ conversion of the catalyst sulfided in Example 9 ("slow" sulfidation process) was 43 wt-%/wt-% at 695° F., as opposed to the 20 to 35 wt-%/wt-% conversion rates obtained from conventional catalysts (Ni—Mo on alumina, Co—Mo—W and Ni—Mo—W unsupported catalysts) and embodiments of the catalyst precursors sulfided using a "quick" sulfidation process (see 700° F.+ conversion results in Table 2). Additionally, the catalyst sulfided in Example 9 yielded a 700° F.+ product with 0.5 ppm-wt N, as opposed to the ~1 ppm-wt N in Example 7. This amounts to a 10-15° F. gain in 700° F.+ conversion and in HDN activity upon slow sulfidation.

Example 12

Evaluation of Different H2 Partial Pressure

In this example, the catalyst sulfided in Example 10 ("slow" sulfidation) was evaluated for hydrocracking, HDS, and HDN activity using a vacuum gas oil (VGO) feedstock having the properties shown in Table 5. The catalyst was evaluated under two different reactor conditions, reactor pressures of 400 psi and 600 psi H2 partial pressure respectively, with the same $H_2$ gas rate of 5000 SCFB, and an LHSV of 0.75. At the low pressure of 400 psi H2 partial pressure, the 700° F.+ conversion rate was about 15%, half of the 700° F.+ conversion rate of about 30% at 600 psi H2 partial pressure.

TABLE 5

| Properties | Feedstock |
| --- | --- |
| API Gravity | 20.0 |
| N, ppm | 1100 |
| S, wt % | 2.72 |
| Carbon, wt % | 85.6 |
| 22 compounds | |
| Aromatics, vol % | 35.0 |

TABLE 5-continued

| Properties | Feedstock |
| --- | --- |
| Naphthenes, vol % | 27.8 |
| Paraffins, vol % | 13.5 |
| Sulfur compounds, vol % | 23.7 |
| Simdist, wt % | |
| 0.5/5 | 640/689 |
| 10/30 | 717/800 |
| Properties | Feedstock |
| 50/ | 866 |
| 70/90 | 930/1013 |
| 95/99 | 163/1168 |

Example 13

Zn—Mo—W-Maleate Catalyst Precursor

A catalyst precursor of the formula $(NH_4)^+$ $\{[Zn_{2.62}(OH)_{2.16} (C_4H_2O_4^{2-})_{0.04}] (Mo_{0.42}W_{0.58}O_4)_2\}$ was prepared as follows: 2.01 g of maleic acid was dissolved in 800.06 g of deionized water at room temperature. The pH of the resulting solution was within the range of 2-3. 17.68 g of ammonium heptamolybdate $(NH_4)_6Mo_7O_{24}\cdot 4H_2O$ powder was dissolved in the above solution, followed by addition of 24.67 g of ammonium metatungstate $(NH_4)_6H_2W_{12}O_{40}\cdot xH_2O$ (>66.5% W). The pH of the resulting solution was within the range of 4-5. 30 ml of concentrated $(NH_4)OH$ was added to the solution with constant stirring. The resulting molybdate/tungstate solution was stirred for 10 minutes and the pH monitored. The solution had a pH in the range of 9-10 at room temperature and was heated to 90° C. A second solution was prepared containing 59.65 g of zinc nitrate hexahydrate dissolved in 50 g of deionized water. The hot zinc solution was then slowly added over 25 min to the hot molybdate/tungstate solution. The solution had a pH of about 6. The resulting mixture was continuously stirred at 90° C. for 1 hour. A white suspension was filtered while hot. The precipitate was dispersed into 2.5 L of DI water at 70° C. The resulting slurry was stirred for 30 min (pH~7), filtered, and the collected precipitate vacuum dried at room temperature overnight. The material was then further dried at 120° C. for 12 hr. The BET Surface area of the resulting material was 101 m$^2$/g, the average pore volume was around 0.12-0.14 cc/g, and the average pore size was around 5 nm.

Figure 6:
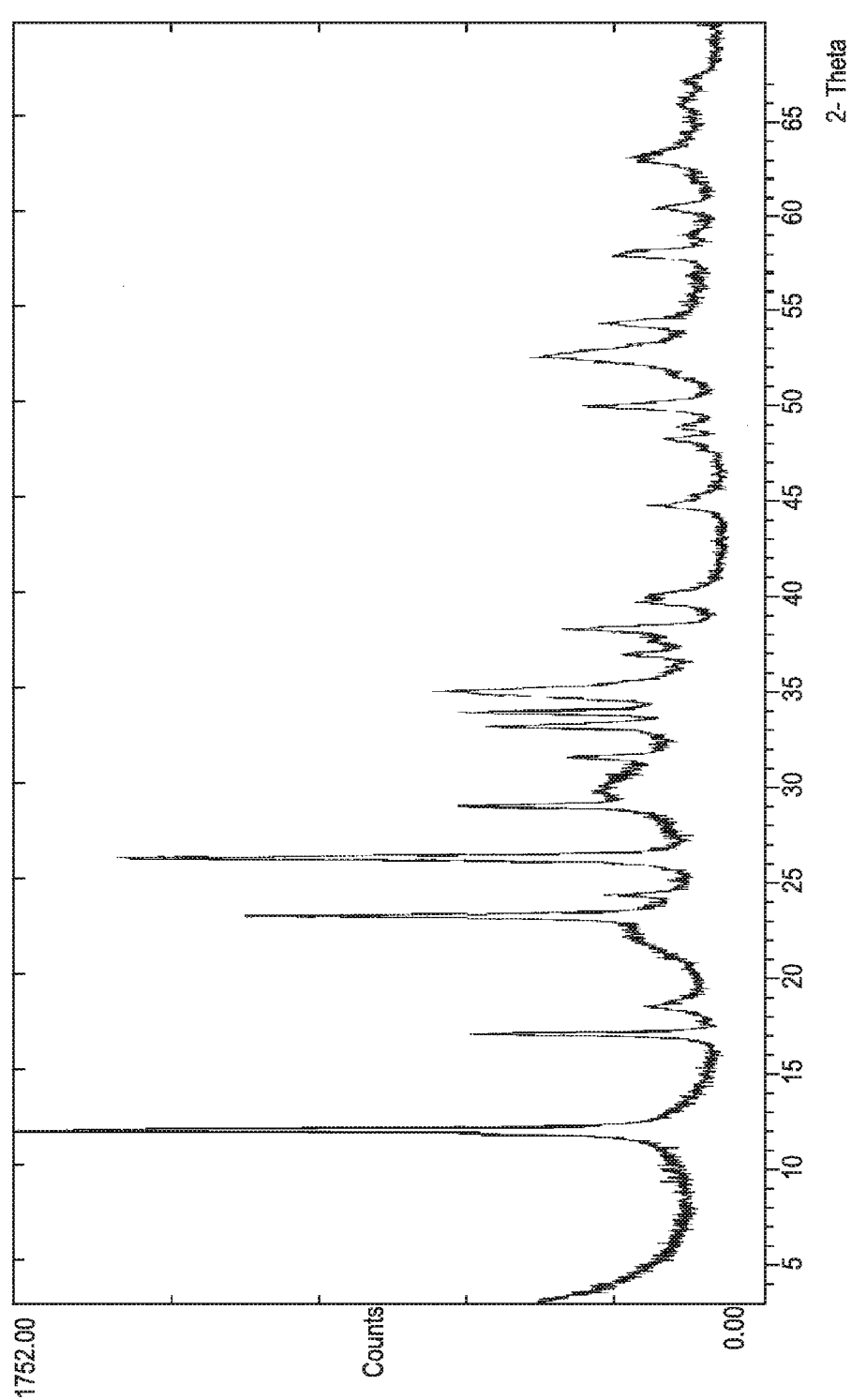
FIG. 6 is a powder X-ray diffraction pattern of a third embodiment of a catalyst precursor compound (based on Zn—Mo—W-maleate).

The PXRD pattern of the catalyst precursor product is shown in FIG. 6.

Example 14

Another Zn—Mo—W-Maleic Catalyst Precursor

A catalyst of the formula $(NH_4)^+$ $\{[Zn_{2.7} (OH)_{2.3} (C_4H_2O_4^{2-})_{0.05}] (Mo_{0.51}W_{0.49}O_4)_2\}$ was prepared as follows: 17.65 g of ammonium heptamolybdate $(NH_4)_6Mo_7O_{24}\cdot 4H_2O$ powder was dissolved in 800.00 g of deionized water at room temperature followed by addition of 24.67 g of ammonium metatungstate $(NH_4)_6H_2W_{12}O_{40}\cdot xH_2O$ (>66.5% W). The pH of the resulting solution was within the range of 5.2-5.4. 30 ml of concentrated $(NH_4)OH$ was added to the solution with constant stirring. The resulting molybdate/tungstate solution was stirred for 10 minutes and the pH monitored. A second solution was prepared containing 59.56 g of zinc nitrate hexahydrate dissolved in 50.02 g of deionized water. 2.0 g of maleic acid was added to the above solution and dissolved fully. The pH of the resulting solution was within the range of 0-1. The zinc solution was then slowly added over 50 min to the molybdate/tungstate solution at room temperature. The resulting mixture was heated to 90° C. and continuously stirred for 1 hour. A white suspension was filtered while hot. The precipitate was dispersed into 2.5 L of DI water at 70° C. The resulting slurry was stirred for 30 min (pH~7), filtered, and the collected precipitate vacuum dried at room temperature overnight. The material was then further dried at 120° C. for 12 hr.

Figure 7:
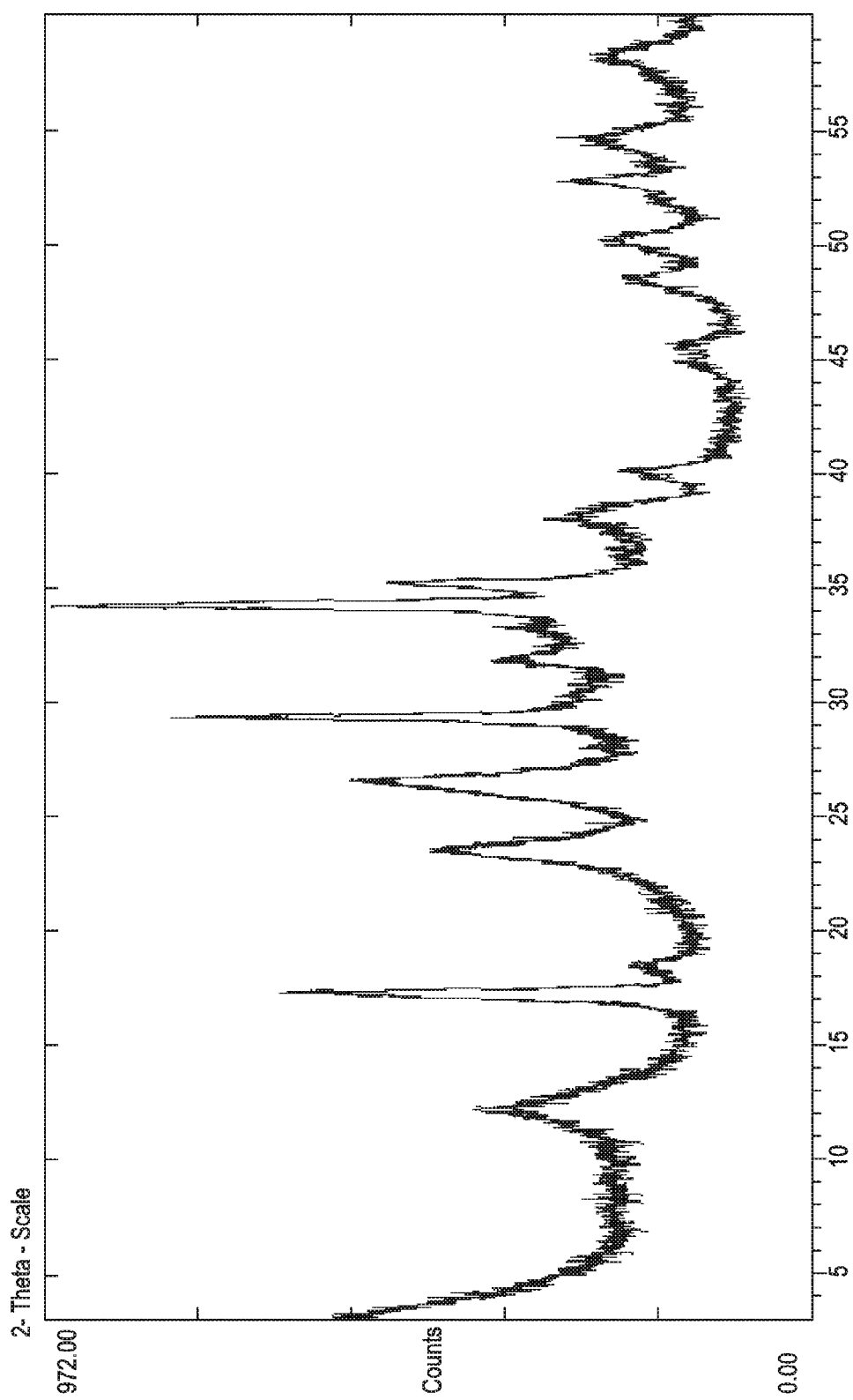
FIG. 7 is a powder X-ray diffraction pattern of a fourth embodiment of a catalyst precursor compound (also based on Zn—Mo—W).

The PXRD pattern of the resulting catalyst precursor is shown in FIG. 7.

Example 15

Extrusion Process

In this example, 40 g of dried catalyst precursor prepared as per Examples 1, 13, and 14 was mixed with 0.8 g of methocel, (a commercially available methylcellulose and hydroxypropyl methylcellulose polymer from Dow Chemical Company), and approximately 7 g of DI water was added. Another 7 g of water was slowly added until the mixture was of an extrudable consistency. The mixture was then extruded and dried under $N_2$ at 120° C. prior to sulfiding.

Example 16

Sulfidation DMDS Liquid Phase

The catalyst precursors of Examples 1, 13, and 14 were placed in a tubular reactor. The temperature was raised to 250° F. at a rate of 100° F./hr under $N_{2(g)}$ at 8 ft$^3$/hr. The reaction was continued for 1 hour after which time the $N_2$ was switched off and replaced with $H_2$ at 8 ft$^3$/hr and 200 psig for 1 hour. VGO oil was pumped over the catalyst precursor at 250° F. at a rate of 130 cc/hr (1 LHSV) while the hydrogen gas rate at 8 cubic feet an hour was maintained. The catalyst precursor was then heated to 430° F. at a rate of 25° F./hr and DMDS was added at a rate of 4 cc/hr for approximately 4 hr. The catalyst precursor was then heated to 600° F., and the rate of DMDS addition increased to 8 cc/hr. The temperature was maintained at 600° F. for 2 hours after which time sulfidation was complete.

Example 17

Sulfidation With DMDS Gas Phase

The catalyst precursors of Examples 1, 13, and 14 were placed in a tubular reactor. The temperature was raised to 450° F. at a rate of 100° F./hr under $N_{2(g)}$ at 8 ft$^3$/hr. The reaction was continued for 1 hour after which time the $N_2$ was switched off and replaced with $H_2$ at 8 ft$^3$/hr and 100 psig for 1 hour. The $H_2$ pressure was then increased to 300 psig and maintained for less than 1 hr. after which time dimethyl disulfide was added at a rate of 4 cc/hour and then reaction allowed to proceed for 4 hr. The catalyst precursor was then heated to 600° F. and the rate of DMDS addition increased to 8 cc/hr. The temperature was maintained at 600° F. for 2 hours after which time sulfidation was complete.

Example 18

Catalyst/Catalyst Precursor Comparison

In this examples, various catalysts/catalyst precursors were evaluated and compared, including conventional catalysts and a comparative catalyst employing the catalyst precursor of the type Ni—Mo—W-maleate (Example 1), a comparative catalyst without the ligand (Example 14), and a catalyst employing an embodiment of the catalyst precursor of the invention (Zn—Mo—W-maleate in Example 13). The evaluation included hydrocracking, HDS, and HDN activity using a vacuum gas oil (VGO) feedstock with a boiling point above 700° F., a sulfur content of 31135 ppm, and a nitrogen content of 31230 ppm. The reactor conditions were at a pressure of 2300 psi, an $H_2$ gas rate of 5000 SCFB, and an LHSV of 0.75.

Ni/Mo/alumina is a conventional supported catalyst Ni—Mo on alumina, Ni/Mo/W is an unsupported catalyst of the type disclosed in U.S. Pat. Nos. 6,712,955 and 6,299,760. Ni—Mo—W-maleate, Zn—Mo—W-maleate, and Zn—Mo—W are catalyst precursors made per Examples 1, 13, and 14, then sulfided as per example 17 (sulfidation with DMDS gas phase). The results of the evaluation are presented in Table 6.

TABLE 6

|  | Feedstock | Ni/Mo/ alumina | Ni/Mo/W | Ni/Mo/W/ maleate | Zn/Mo/W | Zn/Mo/W/ maleate |
|---|---|---|---|---|---|---|
| 700 F.+ conversion (wt-%/wt-%) |  | 34.1 | 30.0 | 30.0 | 19.2 | 42.1 |
| Temperature (° F.) |  | 725 | 700 | 690 | 700 | 700 |
| No Loss yields, Wt % |  |  |  |  |  |  |
| C4 minus | 0.0 | 1.07 | 0.85 | 0.48 | 0.75 | 1.37 |
| C5-180° F. | 0.0 | 0.96 | 0.72 | 1.57 | 0.52 | 1.64 |
| 180-700° F. | 6.5 | 36.2 | 32.77 | 32.05 | 22.88 | 42.84 |
| 700° F.+ | 93.5 | 62.16 | 66.03 | 64.11 | 76.21 | 54.69 |
| Sulfur, ppm | 2.7E+04 | 7.5 | 8.3 | 8 | 1.6E+03 | 11.63 |
| Nitrogen, ppm | 1.2E+03 | <0.25 | 1.2 | 1 | 95 | 0.3 |

As shown in the table, when the Promoter metal was zinc, the addition of an organic oxygen containing ligand to the synthesis of the catalyst precursor improved the catalytic activity by lowering the 30% conversion temperature from 725° F. (conventional Ni—Mo-alumina) and 700° F. (Ni—Mo—W prior art) to 690° F. (Ni—Mo—W-maleate) and approximately 680° F. for an embodiment of the invention, Zn—Mo—W-maleate. Additionally, the 700° F.+ conversion is substantially higher than the 700° F.+ conversion rate obtained for other catalysts. The Zn—Mo—W-maleate catalyst yields a higher activity than any conventional catalyst consisting of group VIII metals combined with group VIB metals.

Example 19

Sn—Mo—W-Maleate Catalyst Precursor

A catalyst precursor of the formula $(NH_4)^+ \{[Sn_{2.26}(OH)_{1.5}(C_4H_2O_4^{2-})_{0.01}](Mo_{0.53}W_{0.47}O_4)_2\}$ was prepared as follows: 2.03 g of maleic acid was dissolved in 600.00 g of deionized water at room temperature. The pH of the resulting solution was within the range of 2-3. 17.67 g of ammonium heptamolybdate $(NH_4)_6Mo_7O_{24} \cdot 4H_2O$ powder was dissolved in the above solution, followed by addition of 24.66 g of ammonium metatungstate $(NH_4)_6H_2W_{12}O_{40} \cdot xH_2O$ (>66.5% W). The pH of the resulting solution was within the range of 4-5. 30 ml (27.06 g) of concentrated $(NH_4)OH$ was added to the solution with constant stirring. The resulting molybdate/tungstate solution was stirred for 10 minutes and the pH monitored. The solution had a pH in the range of 9-10 at room temperature and was heated to 90° C. A second solution was prepared containing 42.99 g of tin sulfate dissolved in 250 g of deionized water. 91.0 g of 50% sulfuric acid was added to the mixture in order to dissolve tin sulfate. The pH of the resulting solution was within the range of 1.0 to 1.2. The tin solution was then slowly added over 40 min to the hot molybdate/tungstate solution. The resulting mixture solution had a pH of about 2. The pH was adjusted to about 7 by a slow addition of 43.5 ml of concentrated ammonium hydroxide. The resulting mixture was continuously stirred at 90° C. for 1 hour. A product was filtered while hot. The precipitate was dispersed into 2.5 L of DI water at 70° C. The resulting slurry was stirred for 30 min (pH~7), filtered, and the collected precipitate vacuum dried at room temperature overnight. The material was then further dried at 120° C. for 12 hr.

Figure 8:
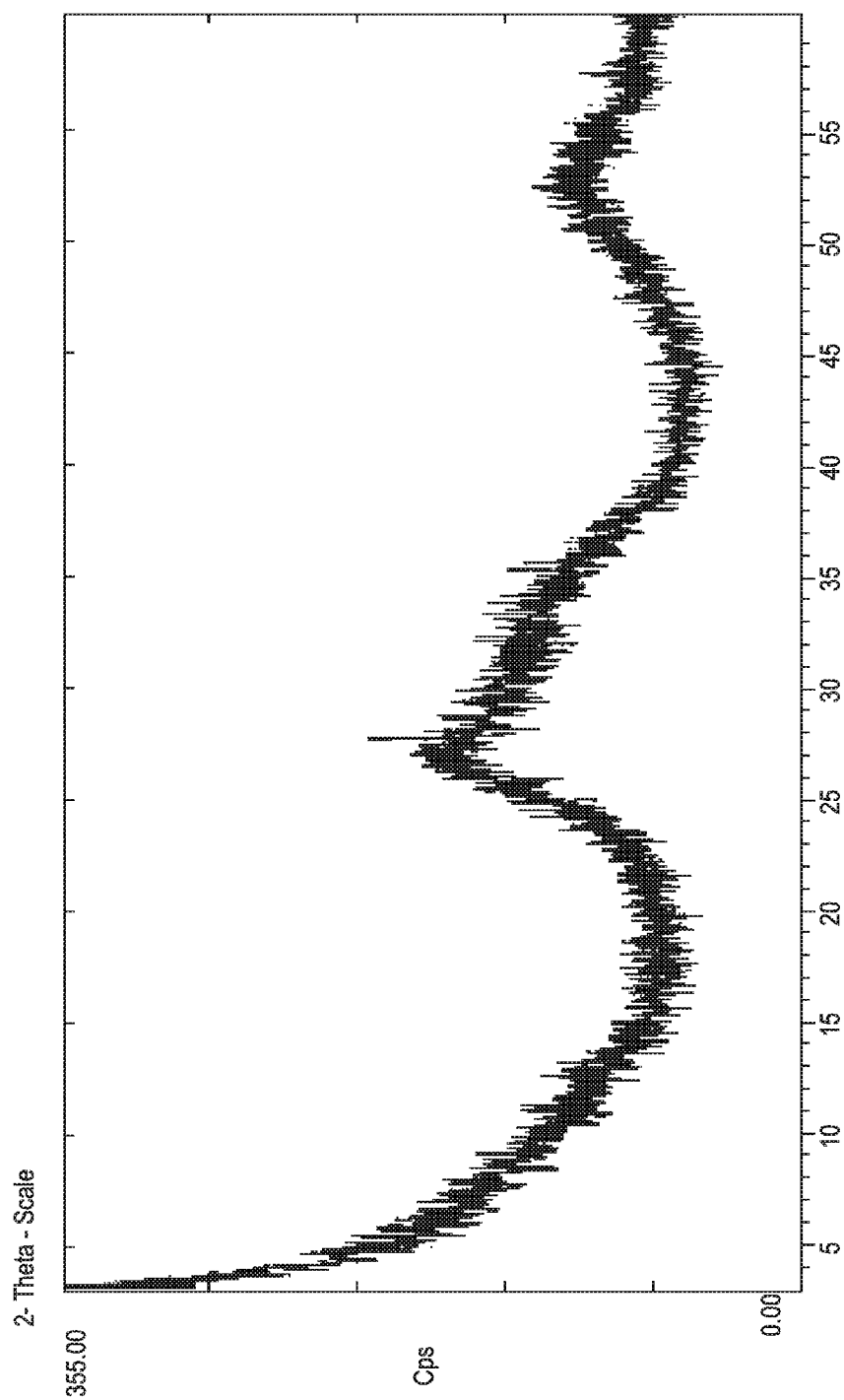
FIG. 8 shows powder X-ray diffraction pattern of a fifth embodiment of a catalyst precursor compound (based on Sn/Mo/W/maleate).

The PXRD pattern of the resulting catalyst precursor is shown in FIG. 8.

Comparative Example 20

Sn—Mo—W Catalyst Precursor

A catalyst of the formula $(NH_4)^+ \{[Sn_{2.31}(OH)_{1.62}](Mo_{0.55}W_{0.45}O_4)_2\}$ was prepared as follows: 17.68 g of ammonium heptamolybdate $(NH_4)_6Mo_7O_{24} \cdot 4H_2O$ powder was dissolved in 600 g of DI water, followed by addition of 24.66 g of ammonium metatungstate $(NH_4)_6H_2W_{12}O_{40} \cdot xH_2O$ (>66.5% W). The pH of the resulting solution was within the range of 5-6. 30 ml (27.1 g) of concentrated $(NH_4)OH$ was added to the solution with constant stirring. The resulting molybdate/tungstate solution was stirred for 10 minutes and the pH monitored. The solution had a pH of about 10.1 at room temperature and was heated to 90° C. A second solution was prepared containing 42.99 g of tin sulfate dissolved in 250 g of deionized water. 58.82 g of 50% sulfuric acid was added to the mixture in order to dissolve tin sulfate. The pH of the resulting solution was within the range of 1.3 to 1.7. The tin solution was then slowly added over 55 min to the hot molybdate/tungstate solution. The resulting mixture solution had a pH of about 2. The pH was adjusted to about 7 by a slow addition of 42.31 g of concentrated ammonium hydroxide. The resulting mixture was continuously stirred at 90° C. for 1 hour. A product was filtered while hot. The precipitate was dispersed into 2.5 L of DI water at 70° C. The resulting slurry was stirred for 30 min (pH~7), filtered, and the collected precipitate vacuum dried at room temperature overnight. The material was then further dried at 120° C. for 12 hr.

Figure 9:
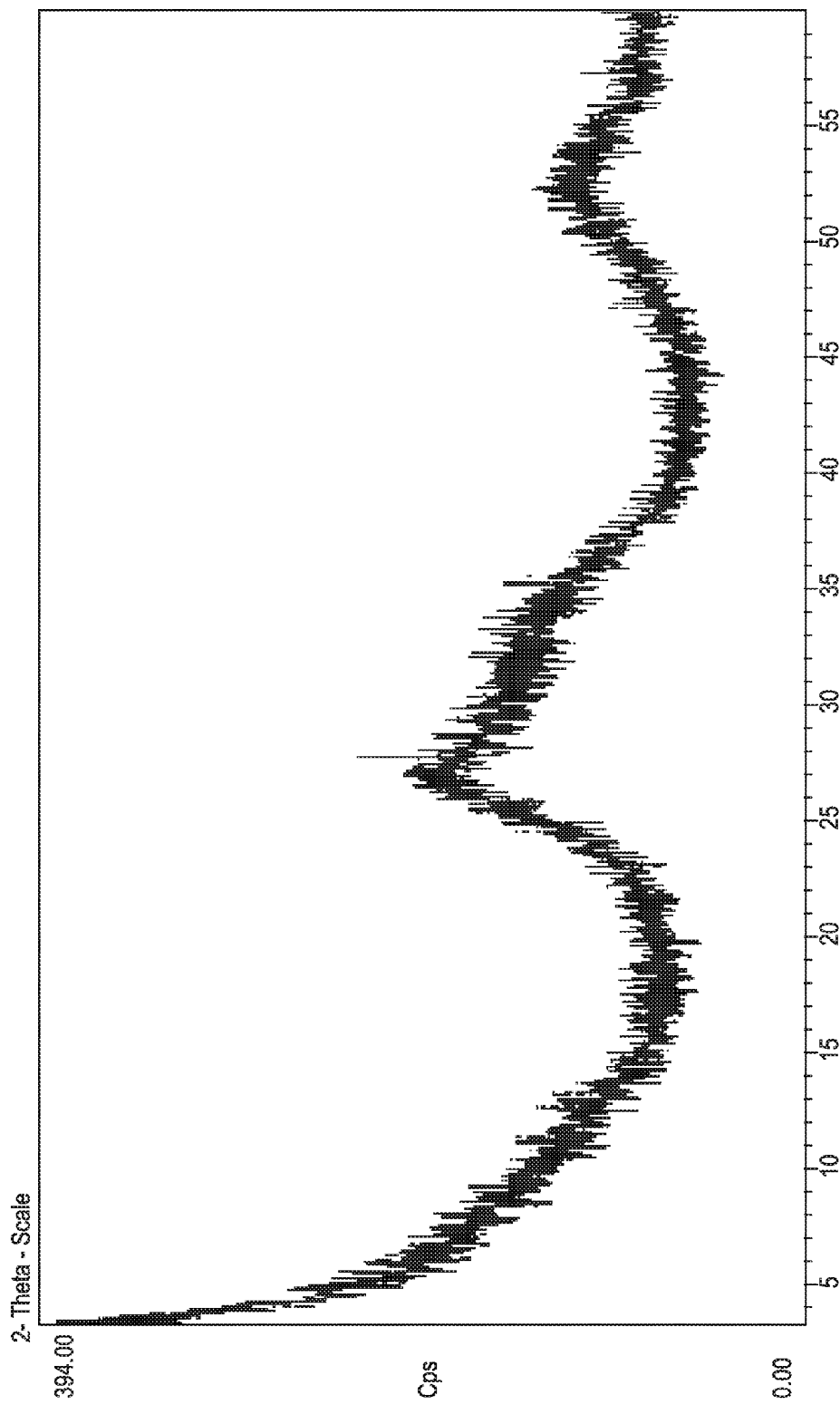
FIG. 9 shows the powder X-ray diffraction pattern of a comparative catalyst precursor compound (Sn/Mo/W without chelating agent).

The PXRD pattern of the resulting comparative catalyst product based on the precursor is shown in FIG. 9.

Example 21

Mg—Ni—Mo—W—Al—Si-Maleate Catalyst Precursor

A catalyst precursor was prepared according to the followings: 1) Add 41.52 g of water glass (27% $SiO_2$, ~14% NaOH Aldrich) to 70 mL of de-ionized water. Stir for 15 min. 2) Dissolve 12.69 g of $Al(NO3)3 \times 9H2O$ in 70 mL of DI water, pH=2.5 at 18.8 C. Adjust the pH to ~1 with ~1 drop of conc. HNO3. 3) With intense agitation slowly add the water glass solution to the aluminum nitrate solution. Adjust the stirring to obtain optimum mixing without splashing. Stir for 0.5 hrs. Keep adjusting pH to below 6 with concentrated HNO3 to avoid gelation. Adjust the pH of the final mixture to ~5.5. 4) Dissolve 52.96 g of AHM $(NH4)_6Mo7O24*4H_2O$ in 1000 g of DI water. pH~5.3@21° C. 5) Add 73.98 g of AMT to the above solution. Mix, till complete dissolution (solution clear). pH~5.3 @ 20° C. 6) With intense agitation add the above solution to a mixture in of step 3. 7) Adjust the pH with concentrated ammonium hydroxide solution to ~9.8. Stir for 10 min. 8) Heat the solution to about 90 C. 9) Dissolved 174.65 g of $Ni(NO3)2*6 H2O$ in 150 g of DI water. pH~3.0 at 21° C. 10) Add 42.26 g of $Mg(NO3)2 \times 6H20$ to the above solution. Mix until it is completely dissolved. Measure the pH. 11) Heat the solution to 90 C. 12) Slowly add the solution from step 11 to a solution from step 8 (~10 min) Stir for 2 hrs. Measure the pH. 13) Filter hot the resulting slurry to a moist filter cake. 14) Dissolve 10.54 g of maleic acid in 1.8 L of DI water. 15) Disperse the moist cake from the step 7 into the maleic acid solution from the step 8. 16) Heat the resulting slurry with agitation to 70° C. and kept it at this temperature for 30 min. 17) Filter hot the resulting blue-green slurry and dry on the funnel at RT under vacuum overnight. 18) Dry the product at 120° C. oven for 12 hrs.

Example 22

Sulfidation DMDS Liquid Phase

The catalyst precursors of Examples 1 and 21 were placed in a tubular reactor. The temperature was raised to 250° F. at a rate of 100° F./hr under $N_{2(g)}$ at 8 ft³/hr. The reaction was continued for 1 hour after which time the $N_2$ was switched off and replaced with $H_2$ at 8 ft³/hr and 200 psig for 1 hour. VGO oil was pumped over the catalyst precursor at 250° F. at a rate of 130 cc/hr (1 LHSV) while the hydrogen gas rate at 8 cubic feet an hour was maintained. The catalyst precursor was then heated to 430° F. at a rate of 25° F./hr and DMDS was added at a rate of 4 cc/hr for approximately 4 hr. The catalyst precursor was then heated to 600° F., and the rate of DMDS addition increased to 8 cc/hr. The temperature was maintained at 600° F. for 2 hours after which time sulfidation was complete.

Example 23

Sulfidation with DMDS Gas Phase

The catalyst precursors of Examples 1 and 21 were placed in a tubular reactor. The temperature was raised to 450° F. at a rate of 100° F./hr under $N_{2(g)}$ at 8 ft³/hr. The reaction was continued for 1 hour after which time the $N_2$ was switched off and replaced with $H_2$ at 8 ft³/hr and 100 psig for 1 hour. The H₂ pressure was then increased to 300 psig and maintained for less than 1 hr. after which time dimethyl disulfide was added at a rate of 4 cc/hour and then reaction allowed to proceed for 4 hr. The catalyst precursor was then heated to 600° F. and the rate of DMDS addition increased to 8 cc/hr. The temperature was maintained at 600° F. for 2 hours after which time sulfidation was complete.

Example 24

Catalyst/Catalyst Precursor Comparison

In this examples, various catalysts/catalyst precursors were evaluated and compared. The evaluation included hydrocracking, HDS, and HDN activity using a vacuum gas oil (VGO) feedstock with a boiling point above 700° F., a sulfur content of 31135 ppm, and a nitrogen content of 31230 ppm. The reactor conditions were at a pressure of 2300 psi, an H₂ gas rate of 5000 SCFB, and an LHSV of 0.75.

Ni/Mo/alumina is a conventional supported catalyst, Ni/Mo/W is an unsupported catalyst along the line of the catalyst referenced in U.S. Pat. No. 6,712,955 and U.S. Pat. No. 6,299,760; Ni/Mo/W/maleate is a catalyst precursor made per example 1 and sulfided as per example 6; Mg—Ni—Mo—W maleate catalyst precursor is a catalyst precursor made per example 21 (with a diluent) and then sulfided per example 23 (sulfidation with DMDS gas phase).

The results are presented in Table 7.

TABLE 7

|  | Feedstock | Ni/Mo/alumina | Ni/Mo/W | Ni/Mo/W/maleate | Mg/Ni/Mo/W/Si/Al maleate |
|---|---|---|---|---|---|
| 700F.+ conversion (wt-%/wt-%) |  | 34.1 | 30.0 | 30.0 | 33.8 |
| Temperature (° F.) |  | 725 | 700 | 690 | 700 |
| No Loss yields, Wt % |  |  |  |  |  |
| C4 minus |  | 0.0 | 1.1 | 0.9 | 0.5 | 1.0 |
| C5-180° F. |  | 0.0 | 1.0 | 0.7 | 1.6 | 1.0 |
| 180-700° F. |  | 6.5 | 36.2 | 32.77 | 32.05 | 35.83 |
| 700° F.+ |  | 93.5 | 62.2 | 66.0 | 64.1 | 65.1 |
| Sulfur, ppm in 700° F.⁺ | 2.7E+04 | 7.5 | 8.3 | 8 | 0.01 |
| Nitrogen, ppm in 700° F.⁺ | 1.2E+03 | <0.25 | 1.2 | 1 | 1.45 |

As shown in the table, when the Group VIII metal was nickel, the addition of IIA metal (magnesia) and the silica-alumina to the synthesis of the catalyst precursor improved the catalytic activity by significantly lowering the sulfur in the fration boiling above 700° F. at about 30% 700° F. conversion from 7.5 (conventional Ni—Mo-alumina) or 8.3 (Ni—Mo—W prior art) or 8 (Ni—Mo—W-maleate catalyst precursor of Example 1) to 0.01 ppm (Mg/Ni/Mo/W/Si/Al maleate catalyst precursor of Example 20).

Example 25

A catalyst based on the Ni—Mo—W-maleate catalyst precursor of Example 1 and sulfided with DMDS gas per example 6 was evaluated in a hydroconversion process. The evaluation included hydrocracking, HDS, and HDN activity using a vacuum gas oil (VGO) feedstock with a boiling point above 700° F., a sulfur content of 31135 ppm, a nitrogen content of 31230 ppm, and other properties as presented in Table 1. The reactor conditions were at a H₂ gas rate of 5000 SCFB, and an LHSV of 0.75, 700° F. Under a hydrogen partial pressure of about 550 psig, the catalyst removed at least 70% of the nitrogen removed under comparable conditions, but at hydrogen partial pressure of about 2100 psig.

Example 26

Example 24 is repeated, except that the hydrogen partial pressure was about 450 psig. Even at a lower hydrogen partial pressure, the multi-metallic catalyst still removed at least 70% of the nitrogen removed at hydrogen partial pressure of about 2100 psig, with other process parameters being comparable.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

TABLE 4

|  | System | | | | | |
|---|---|---|---|---|---|---|
|  | I | | | II | | |
| Run Hours | 504 | 600 | 1008 | 480 | 504 | 888 |
| Total Pressure, PSIG | 1509 | 1512 | 1536 | 1509 | 1528 | 1506 |
| LHSV/WHSV, h − 1 | 1.0/1.27 | 1.0/1.27 | 1.0/1.27 | 1.01/1.24 | 1.01/1.24 | 1.01/1.24 |
| Gas Rate, SCFB | 5381 | 5389 | 5368 | 5349 | 5343 | 5367 |
| C.A.T., F | 751 | 752 | 766 | 731 | 731 | 741 |
| No-loss Yields, wt % |  |  |  |  |  |  |
| C1 | 0.29 | 0.29 | 0.33 | 0.20 | 0.20 | 0.25 |
| C2 | 0.22 | 0.22 | 0.23 | 0.12 | 0.12 | 0.17 |
| C3 | 0.31 | 0.29 | 0.31 | 0.18 | 0.18 | 0.24 |
| i-C4 | 0.08 | 0.08 | 0.08 | 0.04 | 0.04 | 0.07 |

TABLE 4-continued

| | System | | | | | |
|---|---|---|---|---|---|---|
| | I | | | II | | |
| n-C4 | 0.25 | 0.22 | 0.25 | 0.14 | 0.14 | 0.17 |
| C5-180 F. | 0.99 | 0.90 | 0.80 | 0.46 | 0.46 | 0.47 |
| 180-250 F. | 0.60 | 0.54 | 0.70 | 0.08 | 0.08 | 0.25 |
| 250-550 F. | 18.01 | 17.05 | 20.24 | 15.38 | 15.17 | 16.44 |
| 550-700 F. | 34.47 | 34.04 | 34.65 | 34.69 | 34.45 | 34.04 |
| 700 F.+ | 44.60 | 45.96 | 42.07 | 48.16 | 48.59 | 47.40 |
| H2 Consumption, SCFB | 820 | — | 724 | 732 | 726 | — |
| WLP | | | | | | |
| Nitrogen, ppm | 17.0 | 19.9 | 17.4 | 17.6 | 19.3 | 18.8 |
| Sulfur, ppm | 5.8 | 7.3 | 5.9 | 6.8 | 7.2 | 9.3 |
| Stripper Bottoms | | | | | | |
| API gravity | 27.8 | 27.5 | 28.0 | 27.4 | 27.4 | 27.3 |
| Nitrogen, ppm | 17.5 | 20.4 | 18.0 | 17.7 | 19.4 | 19.1 |
| Sulfur, ppm | 5.9 | 7.5 | 6.04 | 6.9 | 7.3 | 9.5 |
| PNA analyses | | | | | | |
| Aromatics, vol % | 35.2 | 35.6 | 37.9 | 32.9 | 33.7 | 35.3 |
| Naphthenes, vol % | 54.9 | 54.4 | 53.0 | 56.1 | 55.7 | 55.0 |
| Paraffins, vol % | 8.3 | 8.3 | 8.3 | 9.2 | 8.9 | 8.1 |
| Cut Point, ° F. | 361 | 366 | 352 | 359 | 359 | 352 |
| Closure, wt % | 100.59 | 99.35 | 97.79 | 98.01 | 96.32 | 97.51 |

The invention claimed is:

1. A process for hydroprocessing a hydrocarbon feedstock which comprises contacting the hydrocarbon feedstock with a catalyst under hydroprocessing conditions,
   wherein the catalyst is formed by sulfiding an unsupported catalyst precursor composition having a formula $A_v[(M^P)(OH)_x(L)^n{}_y]_z(M^{VIB}O_4)$,
   wherein
   A is at least one of an alkali metal cation, an ammonium, an organic ammonium and a phosphonium cation,
   $M^P$ is selected from Group VIII, Group IIB, Group IIA, Group IVA and combinations thereof, P is oxidation state with $M^P$ having an oxidation state of either +2 or +4 depending on the selection of $M^P$,
   L is at least one organic oxygen-containing ligand,
   $M^{VIB}$ is at least a Group VIB metal, having an oxidation state of +6,
   $M^P$:$M^{VIB}$ has an atomic ratio of 100:1 to 1:100,
   $v-2+P*z-x*z+n*y*z=0$; and
   $0<y\leq-P/n$; $0<x\leq P$; $0<v\leq 2$; $0<z$; and
   wherein the unsupported catalyst precursor has an X-ray diffraction pattern that is amorphous with broad peaks or an X-ray diffraction pattern with at least a crystalline peak at Bragg angle between 52.7° to 53.2° theta.

2. The process of claim 1, wherein $M^P$ is at least a Group VIII metal.

3. The process of claim 1, wherein $M^P$ is nickel (Ni).

4. The process of claim 3, wherein $M^{VIB}$ is selected from molybdenum, tungsten, and combinations thereof.

5. The process of claim 4, wherein Ni:(Mo+W) has a molar ratio of 10:1 to 1:10.

6. The process of claim 1, wherein L is negatively charged.

7. The process of claim 1, wherein L is at least one of carboxylates, enolates, and combinations thereof.

8. The process of claim 1, wherein L is maleate.

9. The process of claim 1, wherein the catalyst is formed by in-situ sulfiding.

10. The process of claim 1, wherein the hydrocarbon feedstock is a vacuum gas oil (VGO).

11. The process of claim 10, wherein the hydroprocessing conditions comprise a partial pressure of less than 600 psig.

12. The process of claim 1, for hydroprocessing a hydrocarbon feedstock at a fouling rate of less than 8° F. (4.4° C.) per 1000 hour when the catalyst is employed as the sole catalyst in a reactor system.

13. The process of claim 1, for hydroprocessing a hydrocarbon feedstock at a fouling rate of less than 30° F. (16.7° C.) per 1000 hour when the catalyst is employed in a layered system.

* * * * *